(12) United States Patent
Huang et al.

(10) Patent No.: US 12,356,393 B2
(45) Date of Patent: Jul. 8, 2025

(54) SOUNDING REFERENCE SIGNAL RESOURCE CONFIGURATION FOR TRANSMISSION ANTENNA PORTS

(71) Applicant: QUALCOMM Incorporated, San Diego, CA (US)

(72) Inventors: Yi Huang, San Diego, CA (US); Peter Gaal, San Diego, CA (US); Yu Zhang, San Diego, CA (US); Hyojin Lee, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 578 days.

(21) Appl. No.: 17/733,747

(22) Filed: Apr. 29, 2022

(65) Prior Publication Data

US 2023/0354310 A1    Nov. 2, 2023

(51) Int. Cl.
*H04L 5/00* (2006.01)
*H04W 72/1268* (2023.01)
*H04W 72/23* (2023.01)

(52) U.S. Cl.
CPC ....... *H04W 72/1268* (2013.01); *H04L 5/0051* (2013.01); *H04W 72/23* (2023.01)

(58) Field of Classification Search
CPC .............. H04W 72/1268; H04W 72/23; H04L 5/0048; H04L 5/0094
See application file for complete search history.

(56) References Cited

U.S. PATENT DOCUMENTS

2019/0313385 A1* 10/2019 Yang ..................... H04L 1/1887
2019/0356445 A1* 11/2019 Manolakos .......... H04B 7/0805
(Continued)

FOREIGN PATENT DOCUMENTS

EP    3879738 A1    9/2021

OTHER PUBLICATIONS

3GPP TSG-RAN WG1 Meeting#63bis, R1-110171 Title:Cyclic prefix for positioning reference signal (Year: 2011).*
(Continued)

*Primary Examiner* — Faruk Hamza
*Assistant Examiner* — Abusayeed M Haque
(74) *Attorney, Agent, or Firm* — Holland & Hart LLP

(57) ABSTRACT

Methods, systems, and devices for wireless communications are described. A user equipment may receive signaling from a network entity configuring a sounding reference signal resource set comprising a first sounding reference signal resource associated with a first subset of a total number of sounding reference signal ports and a second sounding reference signal resource associated with a second subset of the total number of sounding reference signal ports supported by the UE. The UE may transmit sounding reference signals via at least one sounding reference signal resource of the plurality of sounding reference signal resources based on the signaling configuring a sounding reference signal resource set. The UE may receive a downlink control information message comprising an indication of a physical uplink shared channel transmission based on at least a subset of the total number of sounding reference signal ports. The UE may transmit the physical uplink shared channel transmission.

30 Claims, 17 Drawing Sheets

(56) References Cited

U.S. PATENT DOCUMENTS

| | | | | |
|---|---|---|---|---|
| 2020/0389908 A1* | 12/2020 | Shabbo | ................ | H04B 7/0456 |
| 2021/0184812 A1* | 6/2021 | MolavianJazi | ....... | H04W 72/23 |
| 2021/0226680 A1 | 7/2021 | Khoshnevisan et al. | | |
| 2021/0314037 A1* | 10/2021 | Rahman | .............. | H04L 25/0226 |
| 2022/0116882 A1* | 4/2022 | Guo | .................... | H04W 52/242 |
| 2023/0035992 A1* | 2/2023 | Zhang | .................. | H04L 5/0023 |

OTHER PUBLICATIONS

3GPP TSG-RAN WG1#84, R1-160422 Title: Multiplexing control and data channel in NB-IoT (Year: 2016).*
International Search Report and Written Opinion—PCT/US2023/015814—ISA/EPO—Jun. 14, 2023.

* cited by examiner

SOUNDING REFERENCE SIGNAL RESOURCE CONFIGURATION FOR TRANSMISSION ANTENNA PORTS

FIELD OF TECHNOLOGY

The following relates to wireless communications, including a sounding reference signal resource configuration for transmission antenna ports.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support sounding reference signal resource configuration for transmission antenna ports. For example, a network entity may transmit signaling configuring a sounding reference signal (SRS) resource set including one or more SRS resources to a user equipment (UE). The UE may transmit the one or more SRS resources to the network entity based on the signaling from the network entity. The network entity may transmit signaling indicating a physical uplink shared channel (PUSCH) to support up to a total number of SRS ports supported by a user equipment (UE) (e.g., up to eight SRS ports). In some examples, the PUSCH may be configured to support less than a total number of SRS ports (e.g., four SRS ports for each SRS resource when a total number of SRS ports is eight). In such examples, the network may provide an indication to the UE (e.g., in an SRS resource indicator (SRI)) in a downlink control information (DCI) message) which may indicate whether the UE is to transmit the PUSCH using some SRS ports (e.g., four SRS ports) in a single SRS resource, or transmit the PUSCH using a total number of SRS ports (e.g., eight SRS ports) across both SRS resources of an SRS resource set.

In some examples, the network entity may configure multiple SRS resources (e.g., three SRS resources) in each SRS resource set, where a subset (e.g., two) of the SRS resources (e.g., two linked SRS resources) may be configured to support less than a total number of SRS ports supported by the UE (e.g., less than eight SRS ports), and a third SRS resource may be configured to support the total number of supported SRS ports (e.g., eight SRS ports). In such examples, the network entity may indicate (e.g., via an indicator, such as a one-bit indicator in radio resource control (RRC) signaling or a media access control (MAC) control element (CE), or an additional bit in the SRI) whether the UE is to transmit the PUSCH using the total number of supported SRS ports in the third SRS resources, or whether the UE is to transmit the PUSCH using multiple SRS resources (e.g., two linked SRS resources). If the UE is to use multiple SRS resources (e.g., two linked SRS resources), codepoints of the SRI in the DCI message may indicate an SRS port configuration (e.g., using a subset of the SRS resources or all of the SRS resources such as both a first SRS resource and a second SRS resource). In some examples, the different codepoints in the SRI may indicate (e.g., without an additional indicator in RRC signaling or in the SRI) whether the UE is to use the third SRS resource, a single one of the linked SRS resources, or all (e.g., both) of the linked SRS resources.

A method for wireless communications at a user equipment (UE) is described. The method may include receiving signaling configuring a sounding reference signal resource set including a first sounding reference signal resource of a set of multiple sounding reference signal resources that is associated with a first subset of a total number of sounding reference signal ports supported by the UE and a second sounding reference signal resource of the set of multiple sounding reference signal resources that is associated with a second subset of the total number of sounding reference signal ports supported by the UE, transmitting sounding reference signals via at least one sounding reference signal resource of the set of multiple sounding reference signal resources based on the signaling configuring a sounding reference signal resource set, receiving a downlink control information message including an indication of a physical uplink shared channel transmission based on at least a subset of the total number of sounding reference signal ports, and transmitting the physical uplink shared channel transmission based on at least the subset of the total number of sounding reference signal ports.

An apparatus for wireless communications at a UE is described. The apparatus may include a processor, memory coupled with the processor, and instructions stored in the memory. The instructions may be executable by the processor to cause the apparatus to receive signaling configuring a sounding reference signal resource set including a first sounding reference signal resource of a set of multiple sounding reference signal resources that is associated with a first subset of a total number of sounding reference signal ports supported by the UE and a second sounding reference signal resource of the set of multiple sounding reference signal resources that is associated with a second subset of the total number of sounding reference signal ports supported by the UE, transmit sounding reference signals via at least one sounding reference signal resource of the set of multiple sounding reference signal resources based on the signaling configuring a sounding reference signal resource set, receive a downlink control information message including an indication of a physical uplink shared channel transmission based on at least a subset of the total number of sounding reference signal ports, and transmit the physical uplink shared channel transmission based on at least the subset of the total number of sounding reference signal ports.

Another apparatus for wireless communications at a UE is described. The apparatus may include means for receiving signaling configuring a sounding reference signal resource set including a first sounding reference signal resource of a set of multiple sounding reference signal resources that is associated with a first subset of a total number of sounding reference signal ports supported by the UE and a second sounding reference signal resource of the set of multiple sounding reference signal resources that is associated with a second subset of the total number of sounding reference signal ports supported by the UE, means for transmitting sounding reference signals via at least one sounding reference signal resource of the set of multiple sounding reference signal resources based on the signaling configuring a sounding reference signal resource set, means for receiving a downlink control information message including an indication of a physical uplink shared channel transmission based on at least a subset of the total number of sounding reference signal ports, and means for transmitting the physical uplink shared channel transmission based on at least the subset of the total number of sounding reference signal ports.

A non-transitory computer-readable medium storing code for wireless communications at a UE is described. The code may include instructions executable by a processor to receive signaling configuring a sounding reference signal resource set including a first sounding reference signal resource of a set of multiple sounding reference signal resources that is associated with a first subset of a total number of sounding reference signal ports supported by the UE and a second sounding reference signal resource of the set of multiple sounding reference signal resources that is associated with a second subset of the total number of sounding reference signal ports supported by the UE, transmit sounding reference signals via at least one sounding reference signal resource of the set of multiple sounding reference signal resources based on the signaling configuring a sounding reference signal resource set, receive a downlink control information message including an indication of a physical uplink shared channel transmission based on at least a subset of the total number of sounding reference signal ports, and transmit the physical uplink shared channel transmission based on at least the subset of the total number of sounding reference signal ports.

In some examples of the method, apparatuses, and non-transitory computer-readable medium described herein, the indication of the physical uplink shared channel transmission may include operations, features, means, or instructions for information in a sounding reference signal resource indicator field of the downlink control information message.

In some examples of the method, apparatuses, and non-transitory computer-readable medium described herein, transmitting the physical uplink shared channel transmission may include operations, features, means, or instructions for transmitting the physical uplink shared channel transmission using the first subset of the total number of sounding reference signal ports in the first sounding reference signal resource according to the indication of the physical uplink shared channel transmission.

In some examples of the method, apparatuses, and non-transitory computer-readable medium described herein, the physical uplink shared channel transmission may include operations, features, means, or instructions for transmitting a first portion of the physical uplink shared channel transmission using the first subset of the total number of sounding reference signal ports in the first sounding reference signal resource according to the indication of the physical uplink shared channel transmission and transmitting a second portion of the physical uplink shared channel transmission using the second subset of the total number of sounding reference signal ports in the second sounding reference signal resource according to the indication of the physical uplink shared channel transmission.

Some examples of the method, apparatuses, and non-transitory computer-readable medium described herein may further include operations, features, means, or instructions for ordering the first subset of the total number of sounding reference signal ports and the second subset of the total number of sounding reference signal ports according to the indication of the physical uplink shared channel transmission, where transmitting the physical uplink shared channel transmission may be based on the ordering.

Some examples of the method, apparatuses, and non-transitory computer-readable medium described herein may further include operations, features, means, or instructions for precoding the first portion of the physical uplink shared channel transmission for the first subset of the total number of sounding reference signal ports and precoding, independently from the first portion of the physical uplink shared channel transmissions, the second portion of the physical uplink shared channel transmission for the second subset of the total number of sounding reference signal ports.

In some examples of the method, apparatuses, and non-transitory computer-readable medium described herein, the first sounding reference signal resource and the second sounding reference signal resource may be located within a single symbol.

In some examples of the method, apparatuses, and non-transitory computer-readable medium described herein, the first sounding reference signal resource may be located within a first symbol and the second sounding reference signal resource may be located within a second symbol.

In some examples of the method, apparatuses, and non-transitory computer-readable medium described herein, each codepoint of the sounding reference signal resource indicator field may be associated with a respective candidate sounding reference signal port configuration and a sum of the first subset of the total number of sounding reference signal ports and the second subset of the total number of sounding reference signal ports may be equal to the total number of sounding reference signal ports.

Some examples of the method, apparatuses, and non-transitory computer-readable medium described herein may further include operations, features, means, or instructions for receiving, in the signaling configuring the sounding reference signal resource set including the set of multiple sounding reference signal resources, an indication of a third sounding reference signal resource of the set of multiple sounding reference signal resources that may be associated with the total number of sounding reference signal ports supported by the UE, where transmitting the sounding reference signals may be based on the indication of the third sounding reference signal resource of the set of multiple sounding reference signal resources.

Some examples of the method, apparatuses, and non-transitory computer-readable medium described herein may further include operations, features, means, or instructions for receiving signaling indicating whether the UE may be to transmit the sounding reference signals via the third sounding reference signal resource, or a combination of the first sounding reference signal resource and the second sounding reference signal resource, where transmitting the sounding reference signals may be based on the second signaling.

In some examples of the method, apparatuses, and non-transitory computer-readable medium described herein, the indication of the physical uplink shared channel transmission may include operations, features, means, or instructions for information in a sounding reference signal resource indicator field of the downlink control information message, and where each codepoint of the sounding reference signal resource indicator field may be associated with a respective candidate sounding reference signal port configuration.

In some examples of the method, apparatuses, and non-transitory computer-readable medium described herein, transmitting the physical uplink shared channel transmission may include operations, features, means, or instructions for transmitting the physical uplink shared channel transmission using the first subset of the total number of sounding reference signal ports in the first sounding reference signal resource according to the indication of the sounding reference signal port configuration.

In some examples of the method, apparatuses, and non-transitory computer-readable medium described herein, transmitting the physical uplink shared channel transmission may include operations, features, means, or instructions for transmitting a first portion of the physical uplink shared channel transmission using the first subset of the total number of sounding reference signal ports in the first sounding reference signal resource according to the indication of the sounding reference signal port configuration and transmitting a second portion of the physical uplink shared channel transmission using the second subset of the total number of sounding reference signal ports in the second sounding reference signal resource according to the indication of the sounding reference signal port configuration.

In some examples of the method, apparatuses, and non-transitory computer-readable medium described herein, transmitting the physical uplink shared channel transmission may include operations, features, means, or instructions for transmitting the physical uplink shared channel transmission using the total number of sounding reference signal ports in the third sounding reference signal resource according to the indication of the physical uplink shared channel transmission.

A method for wireless communications at a network entity is described. The method may include outputting signaling configuring a sounding reference signal resource set including a set of multiple sounding reference signal resources, where a first sounding reference signal resource of the set of multiple sounding reference signal resources is associated with a first subset of a total number of sounding reference signal ports supported by a UE and a second sounding reference signal resource of the set of multiple sounding reference signal resources is associated with a second subset of the total number of sounding reference signal ports supported by the UE, obtaining sounding reference signals via at least one sounding reference signal resource of the set of multiple sounding reference signal resources based on the signaling configuring a sounding reference signal resource set, outputting a downlink control information message including an indication of a physical uplink shared channel transmission based on at least a subset of the total number of sounding reference signal ports, and receiving the physical uplink shared channel transmission based on at least the subset of the total number of sounding reference signal ports.

An apparatus for wireless communications at a network entity is described. The apparatus may include a processor, memory coupled with the processor, and instructions stored in the memory. The instructions may be executable by the processor to cause the apparatus to output signaling configuring a sounding reference signal resource set including a set of multiple sounding reference signal resources, where a first sounding reference signal resource of the set of multiple sounding reference signal resources is associated with a first subset of a total number of sounding reference signal ports supported by a UE and a second sounding reference signal resource of the set of multiple sounding reference signal resources is associated with a second subset of the total number of sounding reference signal ports supported by the UE, obtain sounding reference signals via at least one sounding reference signal resource of the set of multiple sounding reference signal resources based on the signaling configuring a sounding reference signal resource set, output a downlink control information message including an indication of a physical uplink shared channel transmission based on at least a subset of the total number of sounding reference signal ports, and receive the physical uplink shared channel transmission based on at least the subset of the total number of sounding reference signal ports.

Another apparatus for wireless communications at a network entity is described. The apparatus may include means for outputting signaling configuring a sounding reference signal resource set including a set of multiple sounding reference signal resources, where a first sounding reference signal resource of the set of multiple sounding reference signal resources is associated with a first subset of a total number of sounding reference signal ports supported by a UE and a second sounding reference signal resource of the set of multiple sounding reference signal resources is associated with a second subset of the total number of sounding reference signal ports supported by the UE, means for obtaining sounding reference signals via at least one sounding reference signal resource of the set of multiple sounding reference signal resources based on the signaling configuring a sounding reference signal resource set, means for outputting a downlink control information message including an indication of a physical uplink shared channel transmission based on at least a subset of the total number of sounding reference signal ports, and means for receiving the physical uplink shared channel transmission based on at least the subset of the total number of sounding reference signal ports.

A non-transitory computer-readable medium storing code for wireless communications at a network entity is described. The code may include instructions executable by a processor to output signaling configuring a sounding reference signal resource set including a set of multiple sounding reference signal resources, where a first sounding reference signal resource of the set of multiple sounding reference signal resources is associated with a first subset of a total number of sounding reference signal ports supported by a UE and a second sounding reference signal resource of the set of multiple sounding reference signal resources is associated with a second subset of the total number of sounding reference signal ports supported by the UE, obtain sounding reference signals via at least one sounding reference signal resource of the set of multiple sounding reference signal resources based on the signaling configuring a sounding reference signal resource set, output a downlink control information message including an indication of a physical uplink shared channel transmission based on at least a subset of the total number of sounding reference signal ports, and receive the physical uplink shared channel transmission based on at least the subset of the total number of sounding reference signal ports.

In some examples of the method, apparatuses, and non-transitory computer-readable medium described herein, the indication of the physical uplink shared channel transmission may include operations, features, means, or instructions for information in a sounding reference signal resource indicator field of the downlink control information message.

In some examples of the method, apparatuses, and non-transitory computer-readable medium described herein, each codepoint of the sounding reference signal resource indicator field may be associated with a respective candidate sounding reference signal port configuration and a sum of the first subset of the total number of sounding reference signal ports and the second subset of the total number of sounding reference signal ports may be equal to the total number of sounding reference signal ports.

In some examples of the method, apparatuses, and non-transitory computer-readable medium described herein, receiving the physical uplink shared channel transmission may include operations, features, means, or instructions for receiving physical uplink shared channel transmission using the first subset of the total number of sounding reference signal ports in the first sounding reference signal resource according to the indication of the physical uplink shared channel transmission.

In some examples of the method, apparatuses, and non-transitory computer-readable medium described herein, receiving the physical uplink shared channel transmission may include operations, features, means, or instructions for receiving a first portion of the physical uplink shared channel transmission using the first subset of the total number of sounding reference signal ports in the first sounding reference signal resource according to the indication of the physical uplink shared channel transmission and receiving a second portion of the physical uplink shared channel transmission using the second subset of the total number of sounding reference signal ports in the second sounding reference signal resource according to the indication of the physical uplink shared channel transmission.

In some examples of the method, apparatuses, and non-transitory computer-readable medium described herein, the first sounding reference signal resource and the second sounding reference signal resource may be located within a single symbol.

In some examples of the method, apparatuses, and non-transitory computer-readable medium described herein, the first sounding reference signal resource may be located within a first symbol and the second sounding reference signal resource may be located within a second symbol.

Some examples of the method, apparatuses, and non-transitory computer-readable medium described herein may further include operations, features, means, or instructions for outputting, in the signaling configuring the sounding reference signal resource set including the set of multiple sounding reference signal resources, an indication of a third sounding reference signal resource of the set of multiple sounding reference signal resources that may be associated with the total number of sounding reference signal ports supported by the UE, where obtaining the sounding reference signals may be based on the indication of the third sounding reference signal resource of the set of multiple sounding reference signal resources.

Some examples of the method, apparatuses, and non-transitory computer-readable medium described herein may further include operations, features, means, or instructions for outputting second signaling indicating whether the UE may be to transmit the sounding reference signals via the third sounding reference signal resource, or a combination of the first sounding reference signal resource and the second sounding reference signal resource, where obtaining the sounding reference signals may be based on the second signaling.

In some examples of the method, apparatuses, and non-transitory computer-readable medium described herein, the indication of the physical uplink shared channel transmission may include operations, features, means, or instructions for information in a sounding reference signal resource indicator field of the downlink control information message, and where each codepoint of the sounding reference signal resource indicator field may be associated with a respective candidate sounding reference signal port configuration.

In some examples of the method, apparatuses, and non-transitory computer-readable medium described herein, receiving the physical uplink shared channel transmission may include operations, features, means, or instructions for receiving the physical uplink shared channel transmission using the first subset of the total number of sounding reference signal ports in the first sounding reference signal resource according to the indication of the sounding reference signal port configuration.

DETAILED DESCRIPTION

Figure 1:
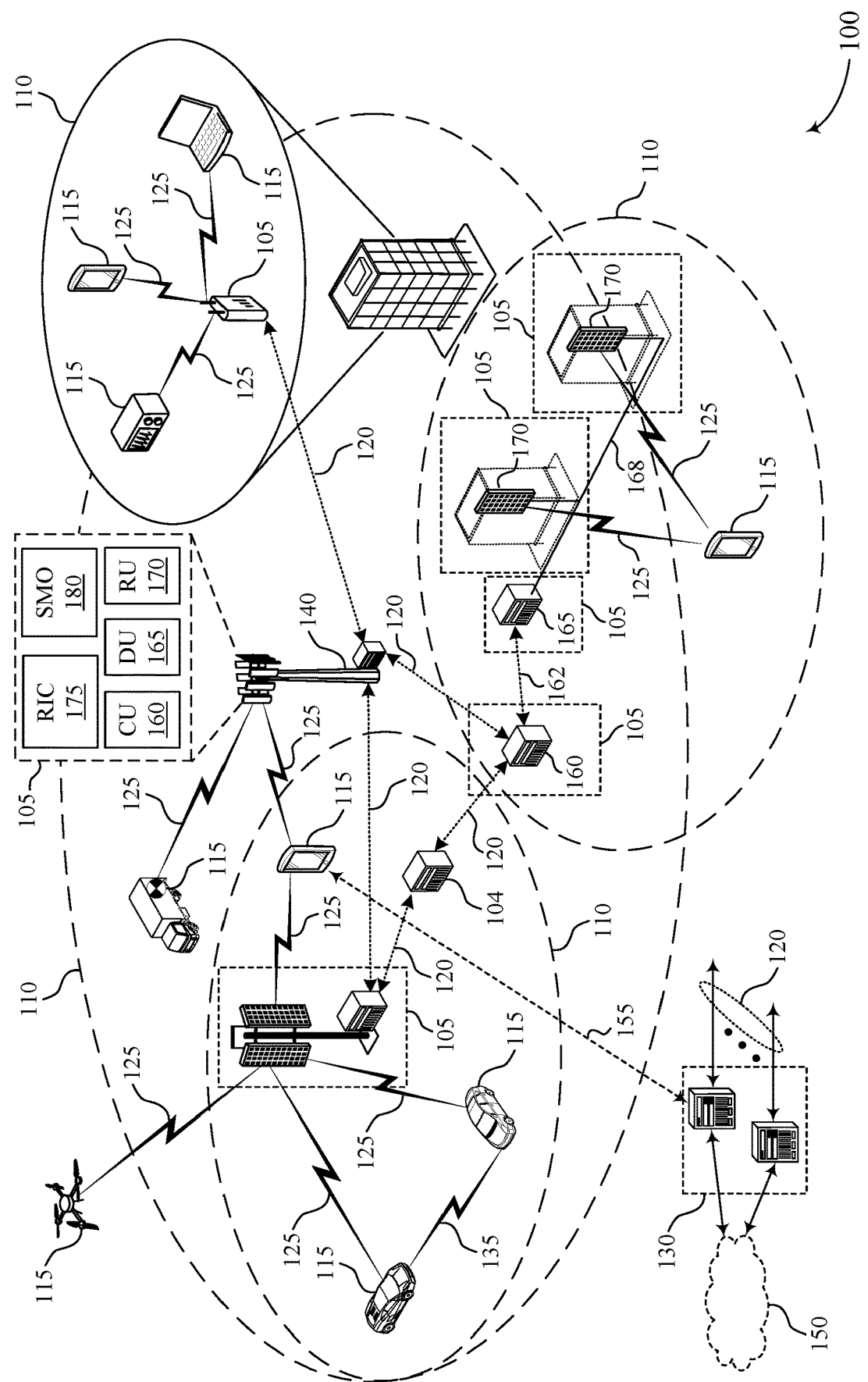
FIG. 1 illustrates an example of a wireless communications system that supports sounding reference signal resource configuration for transmission antenna ports in accordance with one or more aspects of the present disclosure.

In some wireless communications systems, a user equipment (UE) and a network entity may communicate using one or more antenna ports. The UE and the network entity may perform sounding reference signal (SRS) sounding procedures, which may include SRS resource allocation and SRS transmissions. For example, the network entity may transmit signaling configuring an SRS resource set including one or more SRS resources for sounding SRS ports at the UE. The UE may transmit SRS signaling to the network entity in one or more SRS resources of the SRS resource set.

Some UEs may support up to a number of transmit chains, such as four transmit chains (e.g., up to four SRS ports). SRS resource configuration, SRS sounding procedures, and uplink data signaling on the number of transmit chains, such as four transmit chains, may be based on the UE sounding all the supported SRS ports (e.g., all four supported SRS ports). However, in some examples (e.g., in 5G new radio (NR) wireless communications systems), some UEs may support a higher number of transmit chains (e.g., up to eight transmit chains) for data signaling (e.g., on a physical uplink shared channel (PUSCH)). To support up to the higher number of transmit chains (e.g., on a PUSCH), the UE may sound all the supported SRS ports (e.g., eight SRS ports). However, techniques for SRS resource configuration, SRS sounding, and uplink signaling (e.g., among other examples) that are based on a first number of supported transmit chains (e.g., four transmit chains) may not effectively support a higher number of transmit chains (e.g., eight transmit chains) for some UEs, which may result in failed or incomplete SRS procedures, increased latency, inefficient use of resources, and decreased user experience, among other disadvantages.

Techniques described herein provide for SRS resource configuration and SRS sounding to support a larger number of SRS ports (e.g., up to eight SRS ports) than other different techniques. In some examples, a network entity may transmit signaling configuring an SRS resource set including one or more SRS resources. configured for a total number of SRS antenna ports supported by the UE (e.g., eight SRS antenna ports). The network entity may configure multiple SRS resources in each SRS resource set (e.g., two SRS resources), and each of the SRS resources in the SRS resource set may be configured to support a subset of a total number of SRS antenna ports supported by the UE (e.g., each of the SRS resources in the SRS resource set may be configured to support less than eight SRS ports, such as four SRS ports for each SRS resource). The UE may transmit SRS signaling to the network entity in one or more SRS resources of the SRS resource set.

In such examples, the network may transmit an indication (e.g., in an SRS resource indicator (SRI)) in a message (e.g., a downlink control information (DCI) message), which may indicate whether the UE is to transmit a physical uplink channel (PUSCH). The network entity may configure for the PUSCH to be transmitted on a subset of the total number of SRS antenna ports supported by the UE (e.g., each of the SRS resources in the SRS resource set may be configured to support less than eight SRS ports, such as four SRS ports for each SRS resource). In this case, the UE may transmit the PUSCH using a number (e.g., four) SRS ports in a single SRS resource, or the UE may transmit the PUSCH using another number (e.g., eight, a total number) of SRS ports across one or more (e.g., both) SRS resources.

In some examples, the network entity may configure multiple SRS resources (e.g., three SRS resources) in each SRS resource set, where a subset (e.g., two) of the SRS resources (e.g., two linked SRS resources) may be configured to support less than a total number of SRS ports supported by the UE (e.g., eight SRS ports), and a third SRS resource may be configured to support the total number of supported SRS ports (e.g., eight SRS ports). In such examples, the network entity may indicate (e.g., via an indicator, such as a one-bit indicator, in radio resource control (RRC) signaling or a media access control (MAC) control element (CE), or an additional bit in the SRI) whether the UE is to transmit the PUSCH using the third SRS resources, or whether the UE is to transmit the PUSCH using multiple SRS resources (e.g., two linked SRS resources). If the UE is to use multiple SRS resources (e.g., two linked SRS resources), codepoints of the SRI in the DCI message may indicate an SRS port configuration (e.g., using a subset of the SRS resources or all of the SRS resources such as both a first SRS resource and a second SRS resource). In some examples, the different codepoints in the SRI may indicate (e.g., without an additional indicator in RRC signaling or in the SRI) whether the UE is to use the third SRS resource, a single one of the linked SRS resources, or all (e.g., both) of the linked SRS resources.

Techniques described herein may support a large number of transmit chains (e.g., up to eight transmit chains), which may result in increased throughput, more efficient use of available wireless resources, and decreased latency in wireless communications.

Aspects of the disclosure are initially described in the context of wireless communications systems. Aspects of the disclosure are further illustrated by and described with reference to Aspects of the disclosure are further illustrated by and described with reference to wireless communications systems, SRS port configuration schemes, and process flows. Aspects of the disclosure are further illustrated by and described with reference to apparatus diagrams, system diagrams, and flowcharts that relate to a sounding reference signal resource configuration for transmission antenna ports.

FIG. 1 illustrates an example of a wireless communications system 100 that supports sounding reference signal resource configuration for transmission antenna ports in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support sounding reference signal resource configuration for transmission antenna ports as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $TS=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz).

Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some wireless communications systems, a UE 115 and a network entity 105 may communicate using MIMO communications, which may include transmitting signaling using one or more antenna panels, subpanels, antenna ports, or any combination thereof. The UE 115 (e.g., a customer premise equipment (CPE) device or fixed wireless access (FWA) device) and a network entity 105 may communicate over a communication link 125. In some examples, the UE 115 and the network entity 105 may perform SRS sounding procedures. For example, the network entity 105 may transmit signaling to the UE 115 associated with a codebook configuration. The codebook configuration may indicate at least an SRS port configuration (e.g., a configuration of SRS resources from a set of SRS resources) for the SRS sounding procedures. The codebook configuration may be, for instance, of a particular type (e.g., one of a type 1 single panel configuration or a type 1 multi-panel configuration), where each codebook type corresponds to a supported configuration of antenna elements. An SRI field in a DCI message may indicate codepoints associated with the codebook. In some examples, each codepoint of the SRI is associated with an SRS resource and an SRS port configuration for at least a subset of a total number of antenna ports supported by the UE. The UE 115 may aggregate or separate SRS resources according to one or more codebook configurations.

In some examples, the network entity 105 may transmit signaling configuring an SRS resource set including one or more SRS resources configured for a total number of SRS ports supported by the UE 115 (e.g., eight SRS ports). In some examples, the network entity 105 may configure multiple SRS resources in each SRS resource set (e.g., two SRS resources), and each of the SRS resources in the SRS resource set may be configured to support a subset of a total number of SRS ports supported by the UE 115 (e.g., each of the SRS resources in the SRS resource set may be configured to support less than eight SRS ports, such as four SRS ports for each SRS resource). The UE 115 may transmit SRS signaling (e.g., the one or more SRS resources) based on the signaling by the network entity 105.

In such examples, the network may transmit an indication (e.g., in an SRS resource indicator (SRI)) in a downlink control information (DCI) message, which may indicate whether the UE 115 is to transmit a physical uplink shared channel (PUSCH) using four SRS ports in a single SRS resource, or transmit the PUSCH using eight SRS ports across both SRS resources. The UE 115 may transmit the PUSCH, portions of the PUSCH, or a combination thereof. The portions of the PUSCH may be a same portions, a different portion, or a combination thereof. The network entity may configure for the PUSCH, or portions of the PUSCH, to be transmitted on a subset of the total number of SRS antenna ports supported by the UE (e.g., each of the SRS resources in the SRS resource set may be configured to support less than eight SRS ports, such as four SRS ports for each SRS resource).

In some examples, the network entity 105 may configure multiple SRS resources (e.g., three SRS resources) in each SRS resource set, where two of the SRS resources (e.g., two linked SRS resources) may be configured to support less than a total number of SRS ports supported by the UE 115 (e.g., eight SRS ports), and a third SRS resource may be configured to support the total number of supported SRS ports (e.g., eight SRS ports). In such examples, the network entity 105 may indicate (e.g., via a one-bit indicator in radio resource control (RRC) signaling or a media access control (MAC) control element (CE), or an additional bit in the SRI) whether the UE 115 is to transmit the PUSCH using the third SRS resources, or whether the UE 115 is to transmit the PUSCH using the two linked SRS resources. If the UE 115 is to use the two linked SRS resources, codepoints of the SRI in the DCI message may indicate an SRS port configuration (e.g., using one of the two linked SRS resources or both the first SRS resource and the second SRS resource). In some examples, the different codepoints in the SRI may indicate (e.g., without an additional one-bit indicator in RRC signaling or in the SRI) whether the UE 115 is to use the third SRS resource, a single one of the linked SRS resources, or both of the linked SRS resources. Techniques described herein may support a large number of transmit chains (e.g., up to eight transmit chains), which may result in increased throughput, more efficient use of available wireless resources, and decreased latency in communications.

Figure 2:
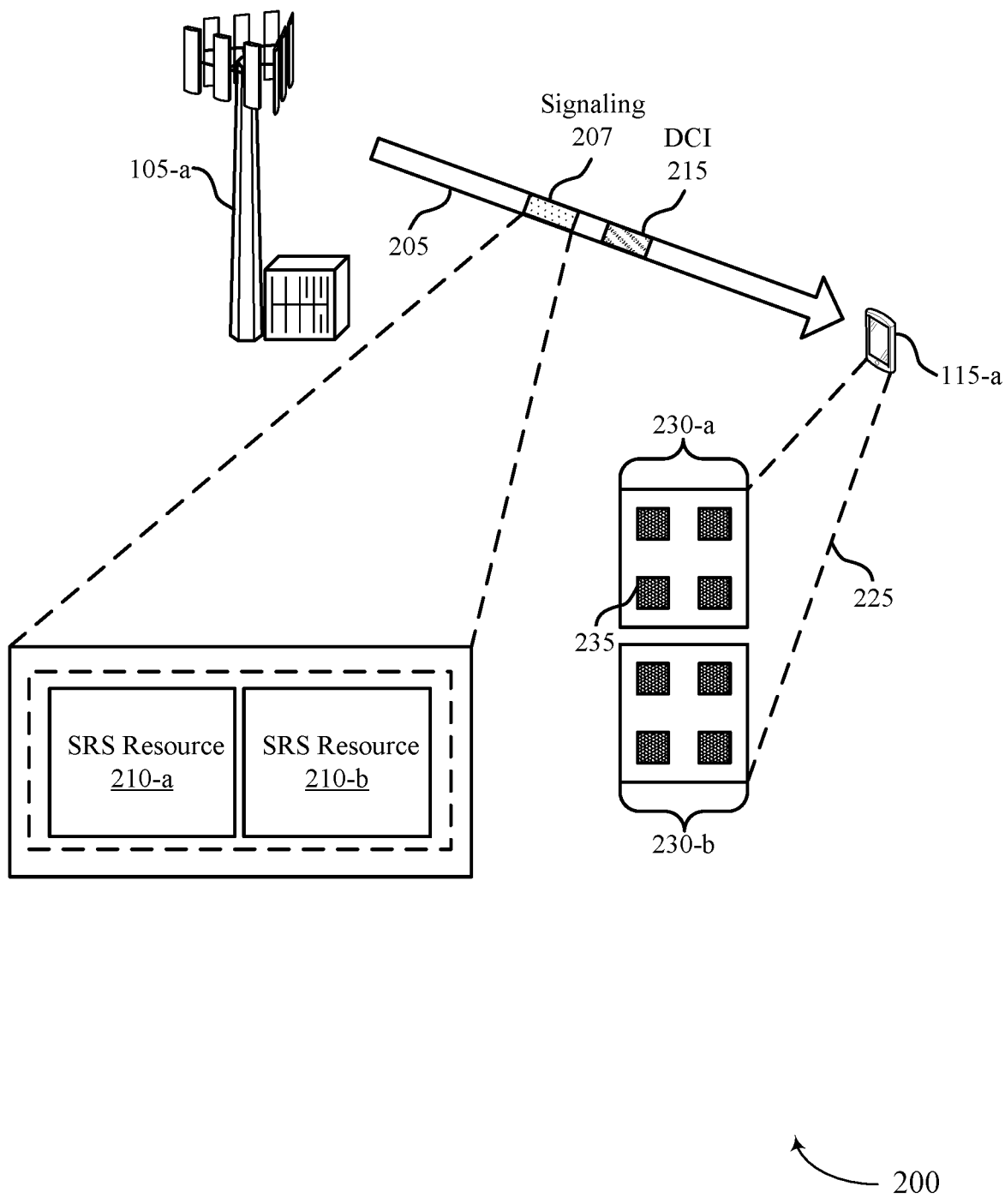
FIG. 2 illustrates an example of a wireless communications system that supports sounding reference signal resource configuration for transmission antenna ports in accordance with one or more aspects of the present disclosure.

FIG. 2 illustrates an example of a wireless communications system 200 that supports sounding reference signal resource configuration for transmission antenna ports in accordance with one or more aspects of the present disclosure. In some examples, the wireless communications system 200 may implement aspects of the wireless communications system 100. For example, the wireless communications system 200 may include a network entity 105-*a* and a UE 115-*a*, which may be examples of a network entity 105 and a UE 115 respectively, as described herein with reference to FIG. 1. The network entity 105-*a* and the UE 115-*a* may be in wireless communication with each other.

The UE 115-*a* and a network entity 105-*a* may communicate by using one or more antenna panels 225, subpanels 230 (e.g., including subpanel 230-*a* and subpanel 230-*b*), antenna elements 235, or any combination thereof. In some examples, the UE 115-*a* may support one or more transmit chains, and may communicate with the network entity 105-*b* using one or more of the supported transmit chains. For example, if the UE 115-*a* supports eight transmit chains, the UE 115-*a* may communicate with the network entity 105-*a* (e.g., using MIMO techniques) on up to eight layers. The UE 115-*a* may utilize all or portions of the antenna panels 225, subpanels 230, and antenna elements 235 to transmit the eight layers. In some examples, the UE 115-*a* may sound one or more SRS ports to perform SRS signaling and PUSCH transmission. The UE 115-*a* may sound a number of ports up to the number of supported transmit chains. In some examples, the UE 115-*a* may support uplink DMRS signaling, SRS signaling, SRI signaling, and TPMI signaling enhancements (e.g., including codebook enhancements) that may enable up to a threshold number (e.g., eight) of transmit chains or layers. Such uplink operations may support four or more (e.g., eight) layers per UE 115 in uplink signaling (e.g., for CPE deployments, FWA deployments, vehicle devices, industrial devices, or the like). In some examples, such techniques may depend on coherence at a device, full power mode or non-full power mode use at the device, or other conditions.

The network entity 105-*a* may communicate with the UE 115-*a* using a downlink 205. In some examples, the UE 115-*a* and the network entity 105-*a* may perform SRS sounding procedures. For example, the network entity 105-*a* may transmit signaling 207 to the UE 115. The signaling 207 may indicate an SRS resource set. The SRS resources of the SRS resource set may include one or more SRS resources 210 (e.g., an SRS resource 210-*a*, an SRS resource 210-*b*, or both). The SRS resource 210-*a* and the SRS resource 210-*b* may be associated with a portion of, or a total number of, antenna ports supported by the UE 115-*a*. The UE 115-*a* may transmit SRS signaling to the network entity 105-*a* in one or more SRS resources 210 of the SRS resource set.

Having received the SRS resources 210 in an SRS resource set, the network entity 105-*a* may transmit DCI 215, which may include an SRI field. The SRI may indicate codepoints corresponding to configurations for SRS ports associated with the SRS resources 210 and PUSCH transmission. In some examples, the UE 115-*a* may support a total number of transmit chains. If techniques for PUSCH transmission do not support the total number of transmit chains, then the UE 115-*a* may operate at less than its total potential performance. If techniques for PUSCH transmission support less than the total number of supported SRS ports, then PUSCH transmission and SRS sounding procedures may fail. Techniques described herein may support PUSCH transmission and SRS sounding procedures for the total number of SRS ports supported by the UE 115-*a*. To support a total number of transmit chains (e.g., eight transmit chains) supported by the UE 115-*a*, the UE 115-*a* may sound an equal number of SRS ports (e.g., eight SRS ports).

In some examples, the UE 115-*a* may sound eight SRS ports using one SRS resources 210. The signaling 207 may configure the UE 115-*a* with one or more SRS resource 210, each configured with the total number of supported SRS ports (e.g., eight SRS ports). The UE 115-*a* may transmit the SRS signaling based on the signaling by the network entity 105-*a*. The network entity 105-*a* may transmit the DCI 215, which may include an SRI. The UE 115-*a* may then set the eight SRS ports in the determined SRS resource 210 as 1000=i, where i=0, 1, 2 . . . , 7. The UE 115-*a* may then effectively use the eight SRS ports to transmit uplink data signaling on a PUSCH. In some examples, as described in greater detail with reference to FIG. 3, the UE 115-*a* may be configured with multiple SRS resources in an SRS resource set, and each SRS resource may be configured with a subset of the total number of supported SRS ports (e.g., each SRS resource in the SRS resource set is configured with less than eight SRS ports). In some examples, as described in greater detail with reference to FIG. 4, the UE 115-*a* may be configured with multiple SRS resources in an SRS resource set, where at least two of the SRS resources are linked (e.g., configured with less than eight SRS ports), and at least one of the SRS resources is not linked (e.g., is configured with the total number of supported SRS ports). In such examples, the network entity 105-a may indicate (e.g., via RRC signaling, a MAC-CE, DCI signaling, or a combination thereof) whether the UE is to use the unlinked SRS resource or one or more of the linked SRS resources.

Figure 3:
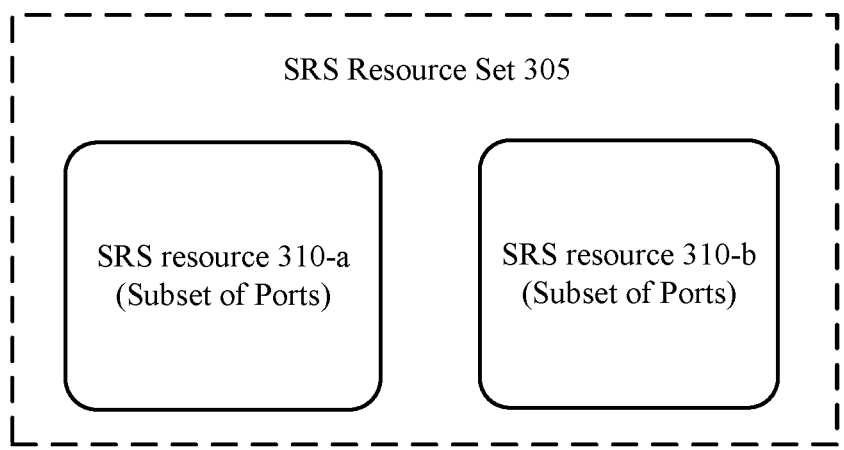
FIG. 3 illustrates an example of an SRS port configuration scheme that supports sounding reference signal resource configuration for transmission antenna ports in accordance with one or more aspects of the present disclosure.

FIG. 3 illustrates an example of an SRS port configuration scheme 300 that supports a sounding reference signal resource configuration for transmission antenna ports in accordance with one or more aspects of the present disclosure. In some examples, the SRS port configuration scheme 300 may implement aspects of wireless communications systems 100 and 200. For example, a UE (e.g., a UE 115 as described with reference to FIG. 1 and FIG. 2), a network entity (e.g., a network entity 105 as described with reference to FIG. 1 and FIG. 2), or both, may implement the SRS port configuration scheme 300 for wireless communications.

In some examples, according to SRS port configuration scheme 300, the network entity may transmit signaling configuring the UE with an SRS resource set 305. The SRS resource set 305 may include one or more SRS resources 310. For example, the SRS resource set 305 may include an SRS resource 310-a and an SRS resource 310-b (e.g., which may be examples of SRS resources 210-a and SRS resource 210-b as described with reference to FIG. 2). The network entity may configure the SRS resources 310 of the SRS resource set 305 via the signaling, and may configure each of the SRS resource with less than a total number of SRS ports supported by the UE (e.g., less than eight SRS ports, such as four SRS ports each) for transmitting the PUSCH to the network entity. The network entity may thus configure multiple SRS resources 310 in an SRS resource set 305, each with less than eight SRS ports. The UE may then concatenate the SRS ports (e.g., the local SRS ports) in the two SRS resources 310 into a list of a total number of SRS ports supported by the UE (e.g., a global list of eight SRSS ports). Although illustrated with reference to two SRS resources 310, the network entity may configure the UE with any number of SRS resources 310, each configured with any number of SRS ports. For example, the SRS resource set 305 may include four SRS resources 310, each configured with two SRS ports, or may include three SRS resources 310 (e.g., one SRS resources configured with a subset of four SRS ports, and two SRS resources 310 configured with two SRS ports).

The ports of the SRS resources 310 may sound on the same OFDM symbol (e.g., via different cyclic shifts (CSs), or may sound on different OFDM symbols. For instance, the UE 115-a may increase the amount of sounding power per SRS port by sounding the subsets of SRS ports during different symbols. The network entity may configure the SRS resources 310 in the same OFDM symbol. In such examples, the UE may sound all eight SRS ports during the same OFDM symbol, and may divide the total sounding power for that OFDM symbol across all eight SRS ports (e.g., resulting in a smaller sounding power per SRS port). In some examples, the network entity may configure the SRS resources 310 to be located in the same OFDM symbol, in which case the UE may divide its total available sounding power across four SRS ports in SRS resource 310-a and four SRS ports in SRS resource 310-b (e.g., resulting in a greater sounding per SRS port). The UE may use the SRS port configuration to transmit the SRS signaling, the PUSCH, or both.

Having received the SRS resources 310 by using less than eight SRS ports each, the network entity may indicate (e.g., via a DCI message carrying a grant) which SRS resource to use (e.g., and therefore which SRS ports to use) to transmit the PUSCH. For example, the network entity may indicate which SRS ports and which SRS resources 310 the UE is to use for PUSCH transmission via a codepoint in an SRI field of the DCI message. The SRI may include an indicator of which SRS resources 310 to use and/or an ordering of SRS ports across linked SRS resources 310. For instance, a two-bit indicator may indicate whether the UE is to sound SRS ports in one SRS resource 310, or both linked SRS resources 310 (e.g., including an order of SRS ports across the linked SRS resources). In such examples, a first codepoint (e.g., SRS=01) may indicate that the UE is to fall back to using a subset of ports (e.g., only four ports) in one SRS resource 310 (e.g., SRS resource 310-a). A second codepoint (e.g., SRS=10) may indicate that the UE is to fall back to using a subset of ports (e.g., only four ports) in another SRS resource 310 (e.g., SRS resource 310-b). A third codepoint (e.g., SRS=00) may indicate that the UE is to use both linked SRS resources 310 (e.g., all eight ports), and an order of the subsets of SRS ports (e.g., the UE is to append the four ports associated with the SRS resource 310-b after the SRS ports associated with the SRS resource 310-a). A fourth codepoint (e.g., SRS=11) may indicate that the UE is to use both linked SRS resources 310 (e.g., all eight ports), and an order of the subsets of SRS ports (e.g., the UE is to append the four ports associated with the SRS resource 310-a after the SRS ports associated with the SRS resource 310-b). The codepoints, including the ordering, may be preconfigured (e.g., via higher layer signaling), or may be predefined in one or more standard document.

The UE 115 may precode portions of the PUSCH based on the SRS port configuration. For example, the UE may precode each set of ports limited (e.g., confined) within one portion of the PUSCH. That is, the UE may precode a first portion of the PUSCH for the SRS resource 310-a, and may separately precode a second portion of the PUSCH for SRS resource 310-b. In such examples, the UE may precode the subset of ports for PUSCH transmission associated with the SRS resource 310-a independently from the subset of ports associated with the SRS resource 310-b. The UE may use precoders and/or TPMIs associated with subsets of SRS ports (e.g., four SRS ports), instead of precoders associated with the total number of SRS ports supported by the UE (e.g., eight SRS ports).

Figure 4:
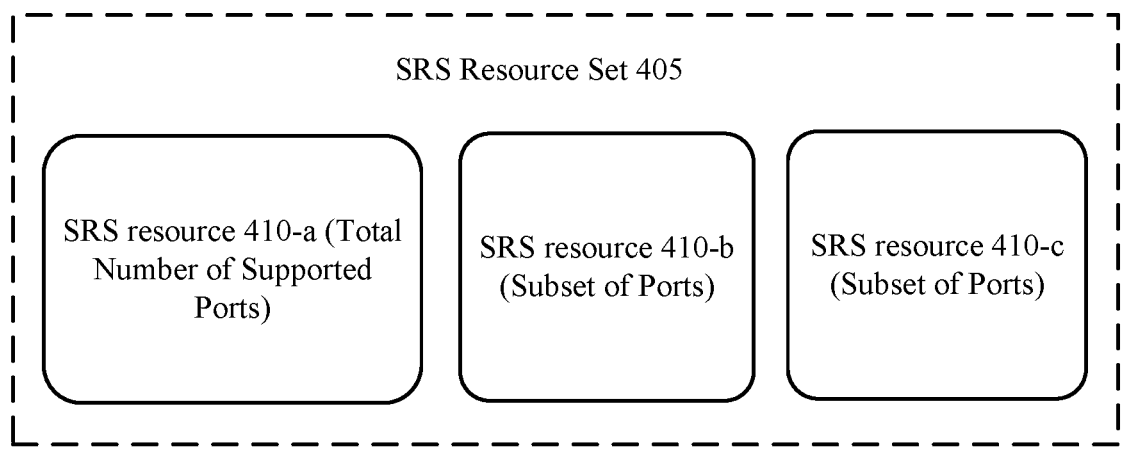
FIG. 4 illustrates an example of an SRS port configuration scheme that supports sounding reference signal resource configuration for transmission antenna ports in accordance with one or more aspects of the present disclosure.

FIG. 4 illustrates an example of an SRS port configuration scheme 400 that supports a sounding reference signal resource configuration for transmission antenna ports in accordance with one or more aspects of the present disclosure. In some examples, the SRS port configuration scheme 400 may implement aspects of wireless communications systems 100 and 200. For example, a UE (e.g., a UE 115 as described with reference to FIG. 1 and FIG. 2), a network entity (e.g., a network entity 105 as described with reference to FIG. 1 and FIG. 2), or both, may implement the SRS port configuration scheme 400 for wireless communications.

The network entity may transmit signaling configuring the UE with an SRS resource set 405. The SRS resource set 405 may include one or more SRS resources 410 (e.g., which may be examples of SRS resource 210-a and SRS resource 210-b as described with reference to FIG. 2. The network entity may configure the SRS resource set 405 with at least one SRS resource 410-a, which may be associated with the total number of SRS resources 410 supported by the ULE (e.g., eight SRS resources 410). The network entity may configure the SRS resource set 405 with more than one linked SRS resources 410-b and 410-c. Each of the SRS resource 410-b and the SRS resource 410-c may be configured with a subset of the total number of SRS ports supported by the UE (e.g., four ports each, as described with reference to FIG. 3). In some examples, the network entity 105 may transmit signaling to the UE 115. Thus, the UE may be capable of sounding all eight SRS ports in one SRS resource (e.g., the SRS resource 410-*a*), or may be capable of sounding all eight SRS ports across linked SRS resources 410 (e.g., four SRS ports in the SRS resource 410-*b* and four SRS ports in the SRS resource 410-*c*).

In some examples, the network entity may transmit an indication of whether the UE is to sound all supported SRS ports in the independent SRS resource 410-*a*, or is to sound subsets of supported SRS ports across linked SRS resources 410. The network entity may transmit the indicator via an RRC message, a medium access control element (MAC-CE) or a DCI message, or a combination thereof. The UE may determine, based on the signaling, whether to use a single SRS resource 410-*a* with eight ports directly, or to concatenate ports in more than one SRS resource 410 (e.g., SRS resource 410-*b* and SRS resource 410-*c*).

In some examples, the indicator may be a one-bit indicator. In some examples a codepoint of the one-bit indicator may indicate that the UE may sound all eight SRS ports in the SRS resource 410-*a*. In such examples, the two bits in the SRI of the DCI message may be obsolete (e.g., the UE may transmit the SRS signaling without additional reference to the SRI codepoints). In some examples, a codepoint of the one-bit indicator may indicate that the UE may sound subsets of SRS ports across linked SRS resources 410. In such examples, the UE may rely on codepoints in the SRI (e.g., the two bits in the SRI field of the DCI message) to indicate an SRS port configuration (e.g., the two bits in the SRI are effective). The SRI (e.g., two bits in the SRI, as described with reference to FIG. 3), may indicate whether the UE is to sound subsets of supported SRS ports in the SRS resource 410-*b*, the SRS resource 410-*b*, or both. The SRI may further indicate an order of the subsets of supported SRS ports.

In some examples, the network entity may indicate whether the UE is to sound all supported SRS ports in the independent SRS resource 410-*a*, or is to sound subsets of supported SRS ports across linked SRS resources 410, using the SRI (e.g., without reference to RRC signaling or an additional one-bit indicator). For instance, the one bit signaling may joint encode the SRS port configuration with the SRI (e.g., without increasing overhead). In such examples, a first codepoint (e.g., SRI=00) may indicate that the UE is to use SRS resource 410-*a* using all eight supported SRS ports. A second codepoint (e.g., SRI=01) may indicate that the UE is to fall back to use a subset of SRS ports (e.g., four SRS ports) in a linked SRS resource (e.g., the SRS resource 410-*b*). A third codepoint (e.g., SRI=10) may indicate that the UE is to fall back and use a subset of SRS ports (e.g., three SRS ports) in a linked SRS resource (e.g., the SRS resource 410-*c*). A fourth codepoint (e.g., SRI=11) may indicate that the UE is to sound all eight SRS resources 410 across both linked SRS resource 410-*b* and linked SRS resource 410-*c*. The fourth codepoint may further indicate an order of the two subsets of SRS ports (e.g., that the UE is to append the SRS ports associated with SRS resource 410-*b* after the SRS ports associated with SRS resource 410-*c*, or vice versa). The codepoints, including the ordering, may be preconfigured (e.g., via higher layer signaling), or may be predefined in one or more standard document. The UE may transmit the SRS signaling based on the signaling by the network entity associated with the SRS resources 410 and the SRS sounding procedure.

Figure 5:
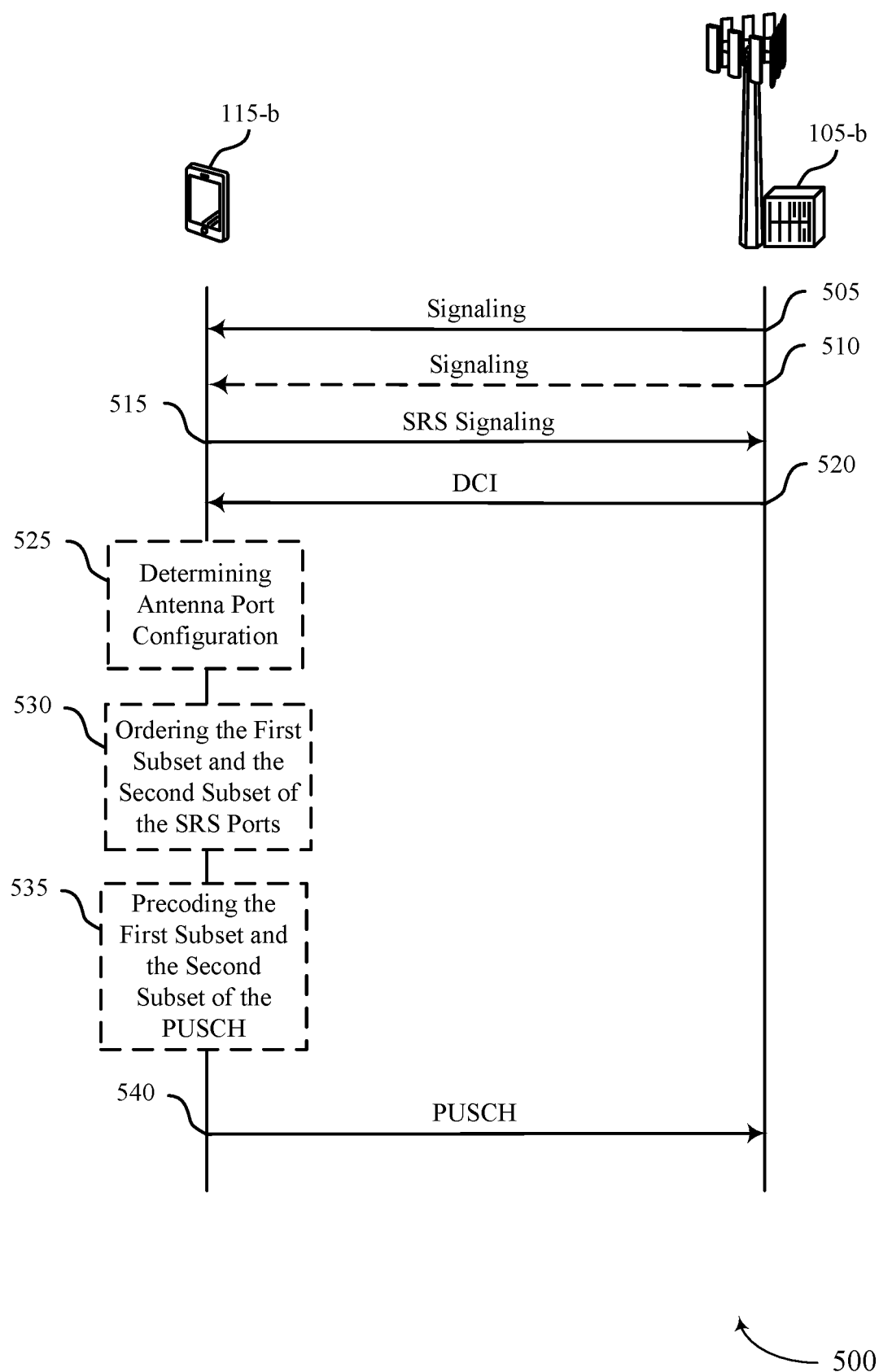
FIG. 5 illustrates an example of a process flow that supports sounding reference signal resource configuration for transmission antenna ports in accordance with one or more aspects of the present disclosure.

FIG. 5 illustrates an example of a process flow 500 that supports a sounding reference signal resource configuration for transmission antenna ports in accordance with one or more aspects of the present disclosure. In some examples, process flow 500 may implement aspects of wireless communications systems 100 and 200, SRS port configuration schemes 300 and 400, or any combination thereof. For example, process flow 500 may include a UE 115-*b* and a network entity 105-*b*, which may be examples of corresponding devices described herein.

At 505, the network entity 105-*b* may output signaling configuring a sounding reference signal resource set including a first sounding reference signal resource of a plurality of sounding reference signal resources associated with a first subset of a total number of sounding reference signal ports supported by the UE 115-*b* and a second sounding reference signal resource of the plurality of sounding reference signal resources associated with a second subset of the total number of sounding reference signal ports supported by the UE 115-*b*. In some examples, signaling configuring the sounding reference signal resource set including the plurality of sounding reference signal resources, an indication of a third sounding reference signal resource of the plurality of sounding reference signal resources associated with the total number of sounding reference signal ports supported by the UE 115-*b*, where transmitting the sounding reference signals is based at least in part on the indication of the third sounding reference signal resource of the plurality of sounding reference signal resources.

At 510, in some examples, the network entity 105-*b* may output signaling indicating whether the UE is to transmit the sounding reference signals via the third sounding reference signal resource, or a combination of the first sounding reference signal resource and the second sounding reference signal resource, where transmitting the sounding reference signals is based at least in part on the second signaling At 515, the UE 115-*b* may transmit sounding reference signals via at least one sounding reference signal resource of the plurality of sounding reference signal resources based on the signaling configuring a sounding reference signal resource set. In some examples, the first sounding reference signal resource and the second sounding reference signal resource are located within a single symbol. In some examples, the first sounding reference signal resource is located within a first symbol and the second sounding reference signal resource is located within a second symbol.

At 520, the network entity 105-*b* may transmit a downlink control information message comprising an indication of a physical uplink shared channel transmission based at least in part on at least a subset of the total number of sounding reference signal ports. In some examples, the indication of the physical uplink shared channel transmission may include information in a sounding reference signal resource indicator field of the downlink control information message. In some examples, each codepoint of the sounding reference signal resource indicator field is associated with a respective candidate sounding reference signal port configuration, and where a sum of the first subset of the total number of sounding reference signal ports and the second subset of the total number of sounding reference signal ports is equal to the total number of sounding reference signal ports. In some examples, the indication of the physical uplink shared channel transmission may include information in a sounding reference signal resource indicator field of the downlink control information message, and where each codepoint of the sounding reference signal resource indicator field is associated with a respective candidate sounding reference signal port configuration.

At 525, the UE 115-b may determine the SRS port configuration based on an indication (e.g., in the DCI message at 515 or the RRC signaling at 510), and/or the codepoint of the SRI. For instance, a one-bit indicator in the RRC signaling or the DCI message may indicate whether the UE 115-b is to transmit the sounding reference signaling in a single SRS resource (e.g., the third SRS resource, such as SRS resource 410-a as described with reference to FIG. 4), or across linked SRS resources 410 (e.g., such as SRS resource 410-b and SRS resource 410-c as described with reference to FIG. 4). The one-bit indicator indicate that the UE 115-b is to sound all eight SRS ports in the third SRS resource (e.g., without reference to any additional codepoints in the SRI). In some examples, the one-bit indicator may indicate that the UE 115-b is to sound the SRS ports across linked SRS resources 410, in which case the UE may sound subsets of SRSs in the first SRS resource and the second SRS resource, as indicated by a codepoint in the SRI. In some examples, the SRI (e.g., without any additional signaling) may indicate whether the UE 115-b is to transmit the SRSs using the third SRS resource, or the linked first and second SRS resources 410, as described in greater detail with reference to FIG. 4.

At 530, in some examples, the UE 115-b may order the first subset of the total number of sounding reference signal ports and the second subset of the total number of sounding reference signal ports according to the indication of the physical uplink shared channel transmission, where transmitting the physical uplink shared channel transmission is based at least in part on the ordering At 535, in some examples, the UE 115-b may precode the first portion of the physical uplink shared channel transmission for the first subset of the total number of sounding reference signal ports. The UE 115-b may precode, independently from the first portion of the physical uplink shared channel transmissions, the second portion of the physical uplink shared channel transmission for the second subset of the total number of sounding reference signal ports At 540, the UE 115-b may transmit the physical uplink shared channel transmission based at least in part on at least the subset of the total number of sounding reference signal ports. In some examples, the UE 115-b may transmit the physical uplink shared channel transmission using the first subset of the total number of sounding reference signal ports in the first sounding reference signal resource according to the indication of the physical uplink shared channel transmission. In some examples, the UE 115-b may transmit a first portion of the physical uplink shared channel transmission using the first subset of the total number of sounding reference signal ports in the first sounding reference signal resource according to the indication of the physical uplink shared channel transmission. The UE 115-b may transmit a second portion of the physical uplink shared channel transmission using the second subset of the total number of sounding reference signal ports in the second sounding reference signal resource according to the indication of the physical uplink shared channel transmission. In some examples, the UE 115-b may transmit the physical uplink shared channel transmission using the first subset of the total number of sounding reference signal ports in the first sounding reference signal resource according to the indication of the sounding reference signal port configuration.

Figure 6:
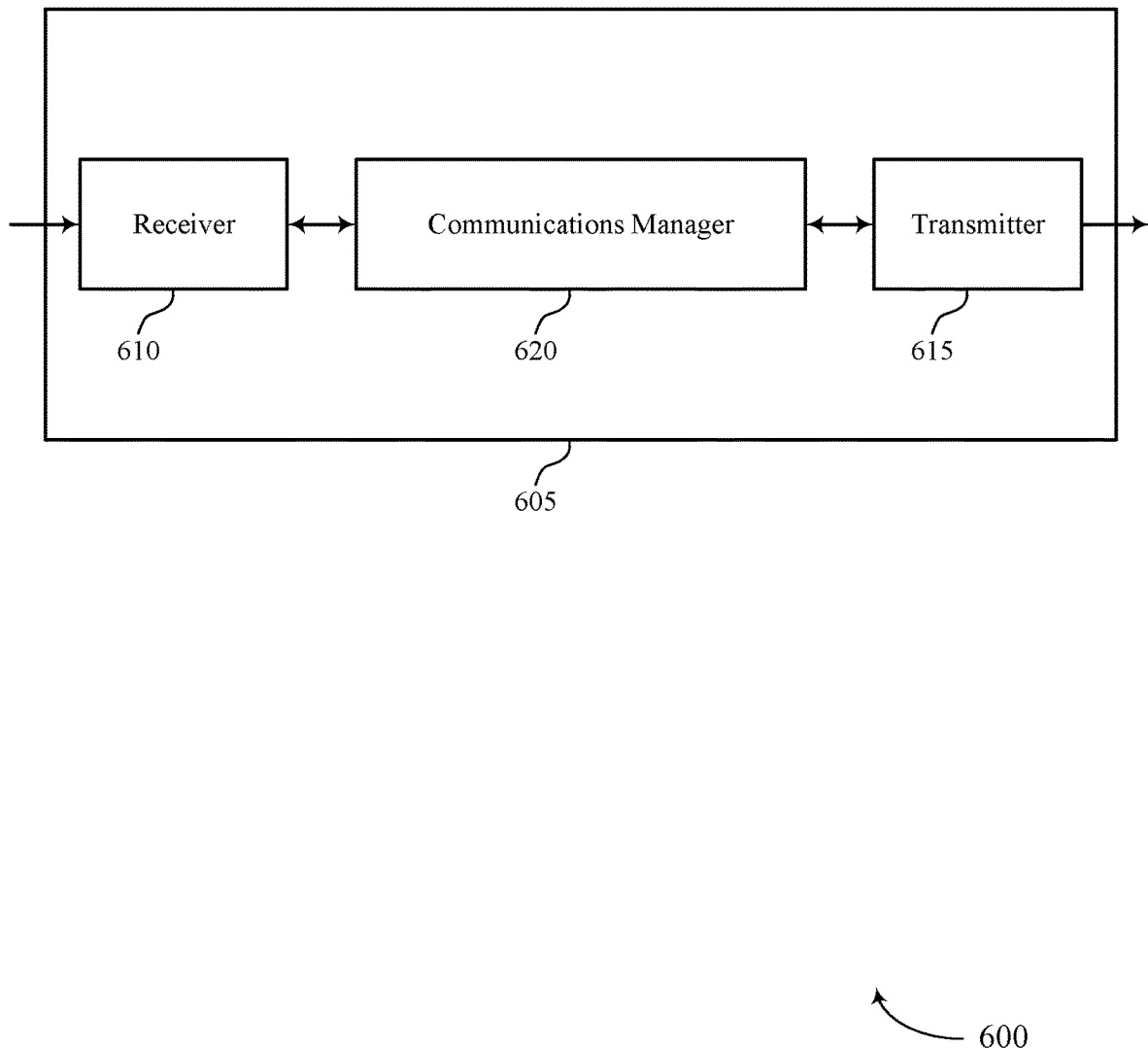
FIGS. 6 and 7 show block diagrams of devices that support sounding reference signal resource configuration for transmission antenna ports in accordance with one or more aspects of the present disclosure.

FIG. 6 shows a block diagram 600 of a device 605 that supports sounding reference signal resource configuration for transmission antenna ports in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sounding reference signal resource configuration for transmission antenna ports). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sounding reference signal resource configuration for transmission antenna ports, such as up to eight transmission antenna ports). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of sounding reference signal resource configuration for transmission antenna ports as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving signaling configuring a sounding reference signal resource set including a first sounding reference signal resource of a set of multiple sounding reference signal resources that is associated with a first subset of a total number of sounding reference signal ports supported by the UE and a second sounding reference signal resource of the set of multiple sounding reference signal resources that is associated with a second subset of the total number of sounding reference signal ports supported by the UE. The communications manager 620 may be configured as or otherwise support a means for transmitting sounding reference signals via at least one sounding reference signal resource of the set of multiple sounding reference signal resources based on the signaling configuring a sounding reference signal resource set. The communications manager 620 may be configured as or otherwise support a means for receiving a downlink control information message including an indication of a physical uplink shared channel transmission based on at least a subset of the total number of sounding reference signal ports. The communications manager 620 may be configured as or otherwise support a means for transmitting the physical uplink shared channel transmission based on at least the subset of the total number of sounding reference signal ports.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for SRS procedures resulting in increased throughput, reduced latency, and more efficient utilization of communication resources.

Figure 7:
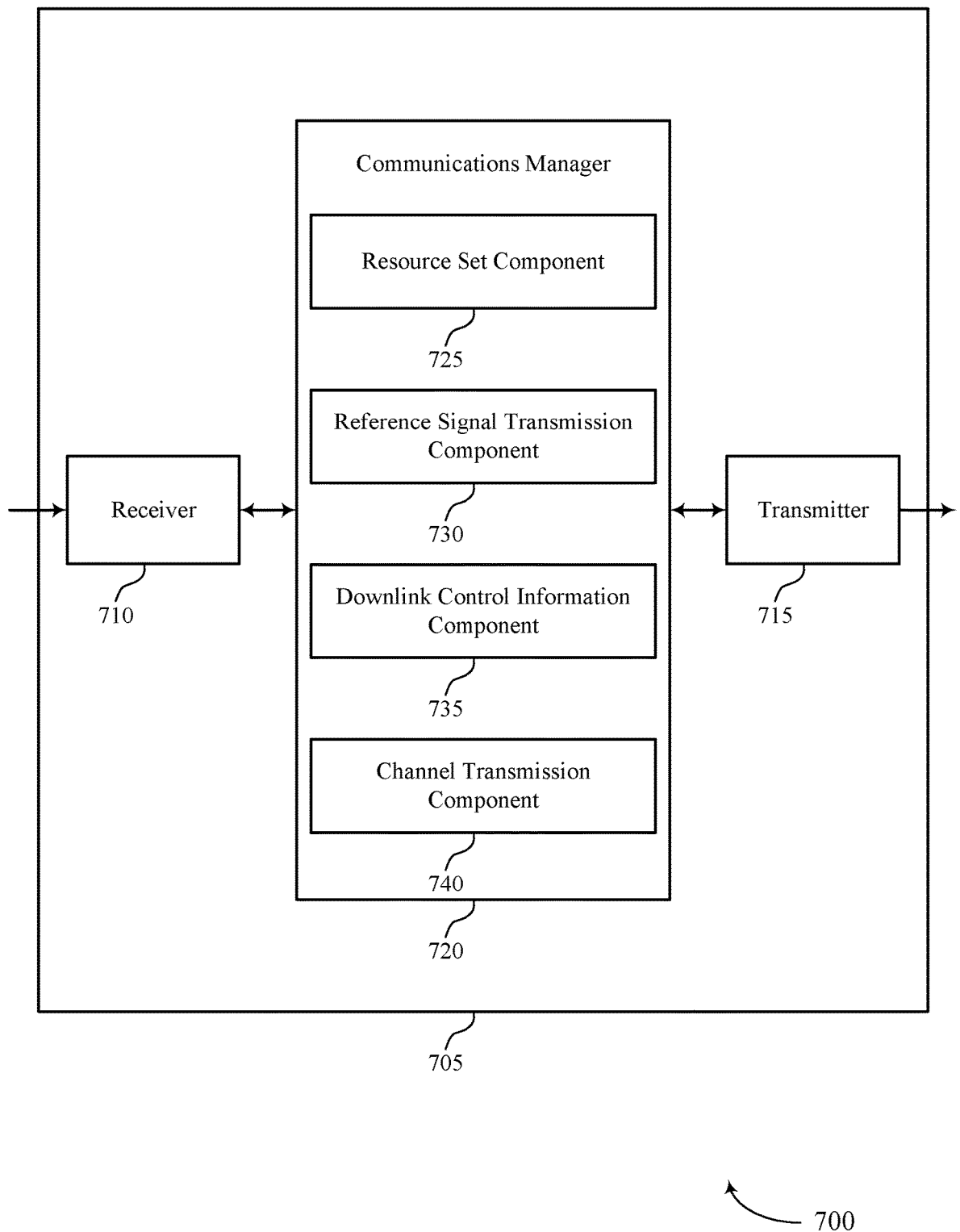

FIG. 7 shows a block diagram 700 of a device 705 that supports sounding reference signal resource configuration for transmission antenna ports in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sounding reference signal resource configuration for transmission antenna ports, such as up to eight transmission antenna ports). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sounding reference signal resource configuration for transmission antenna ports, such as up to eight transmission antenna ports). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of sounding reference signal resource configuration for transmission antenna ports as described herein. For example, the communications manager 720 may include a resource set component 725, a reference signal transmission component 730, a downlink control information component 735, a channel transmission component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The resource set component 725 may be configured as or otherwise support a means for receiving signaling configuring a sounding reference signal resource set including a first sounding reference signal resource of a set of multiple sounding reference signal resources that is associated with a first subset of a total number of sounding reference signal ports supported by the UE and a second sounding reference signal resource of the set of multiple sounding reference signal resources that is associated with a second subset of the total number of sounding reference signal ports supported by the UE. The reference signal transmission component 730 may be configured as or otherwise support a means for transmitting sounding reference signals via at least one sounding reference signal resource of the set of multiple sounding reference signal resources based on the signaling configuring a sounding reference signal resource set. The downlink control information component 735 may be configured as or otherwise support a means for receiving a downlink control information message including an indication of a physical uplink shared channel transmission based on at least a subset of the total number of sounding reference signal ports. The channel transmission component 740 may be configured as or otherwise support a means for transmitting the physical uplink shared channel transmission based on at least the subset of the total number of sounding reference signal ports.

Figure 8:
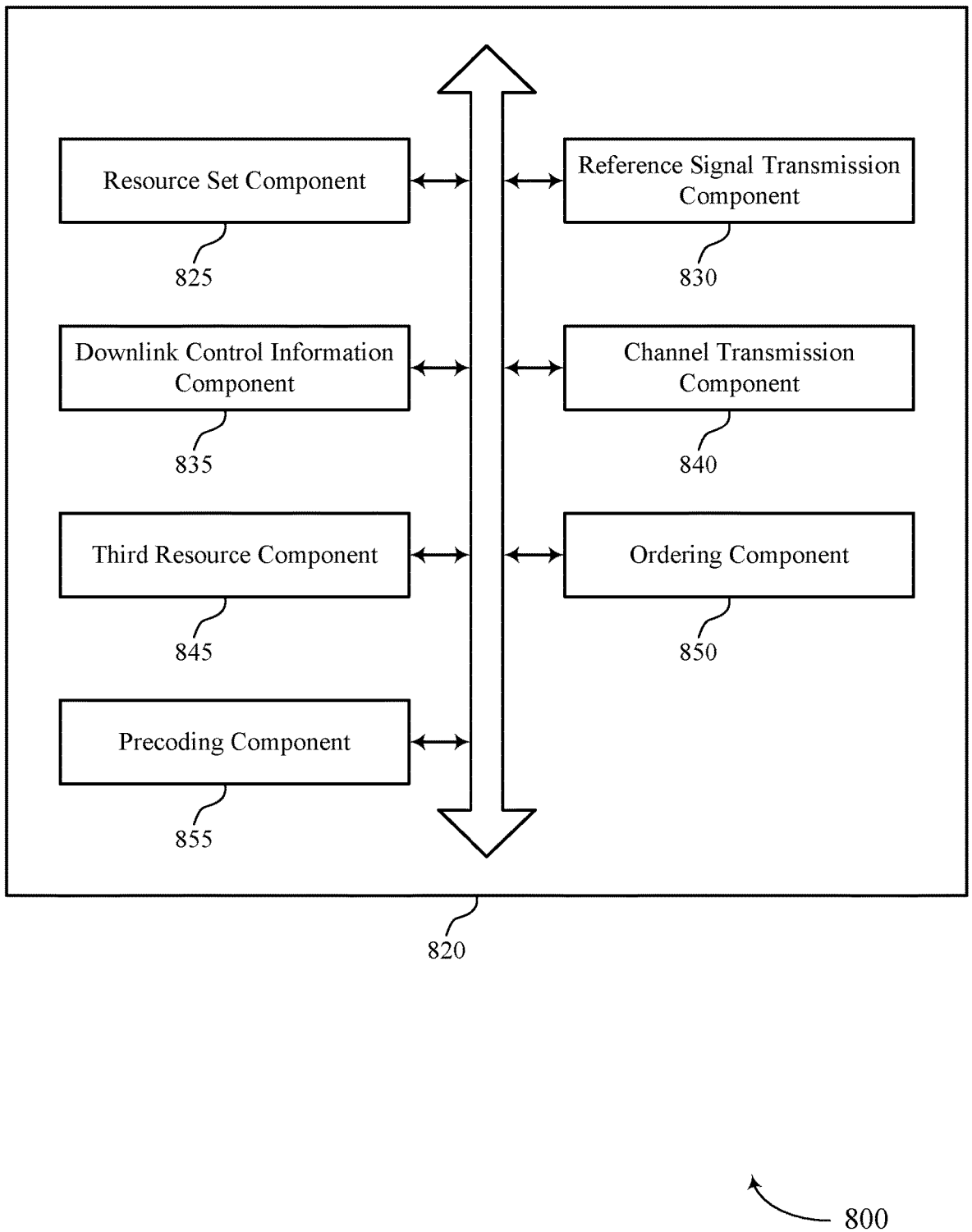
FIG. 8 shows a block diagram of a communications manager that supports sounding reference signal resource configuration for transmission antenna ports in accordance with one or more aspects of the present disclosure.

FIG. 8 shows a block diagram 800 of a communications manager 820 that supports sounding reference signal resource configuration for transmission antenna ports in accordance with one or more aspects of the present disclosure. The communications manager 820 may be an example of aspects of a communications manager 620, a communications manager 720, or both, as described herein. The communications manager 820, or various components thereof, may be an example of means for performing various aspects of sounding reference signal resource configuration for transmission antenna ports as described herein. For example, the communications manager 820 may include a resource set component 825, a reference signal transmission component 830, a downlink control information component 835, a channel transmission component 840, a third resource component 845, an ordering component 850, a precoding component 855, or any combination thereof. Each of these components may communicate, directly or indirectly, with one another (e.g., via one or more buses).

The communications manager 820 may support wireless communications at a UE in accordance with examples as disclosed herein. The resource set component 825 may be configured as or otherwise support a means for receiving signaling configuring a sounding reference signal resource set including a first sounding reference signal resource of a set of multiple sounding reference signal resources that is associated with a first subset of a total number of sounding reference signal ports supported by the UE and a second sounding reference signal resource of the set of multiple sounding reference signal resources that is associated with a second subset of the total number of sounding reference signal ports supported by the UE. The reference signal transmission component 830 may be configured as or otherwise support a means for transmitting sounding reference signals via at least one sounding reference signal resource of the set of multiple sounding reference signal resources based on the signaling configuring a sounding reference signal resource set. The downlink control information component 835 may be configured as or otherwise support a means for receiving a downlink control information message including an indication of a physical uplink shared channel transmission based on at least a subset of the total number of sounding reference signal ports. The channel transmission component 840 may be configured as or otherwise support a means for transmitting the physical uplink shared channel transmission based on at least the subset of the total number of sounding reference signal ports.

In some examples, to support indication of the physical uplink shared channel transmission, the downlink control information component 835 may be configured as or otherwise support a means for information in a sounding reference signal resource indicator field of the downlink control information message.

In some examples, to support transmitting the physical uplink shared channel transmission, the channel transmission component 840 may be configured as or otherwise support a means for transmitting the physical uplink shared channel transmission using the first subset of the total number of sounding reference signal ports in the first sounding reference signal resource according to the indication of the physical uplink shared channel transmission.

In some examples, to support physical uplink shared channel transmission, the channel transmission component 840 may be configured as or otherwise support a means for transmitting a first portion of the physical uplink shared channel transmission using the first subset of the total number of sounding reference signal ports in the first sounding reference signal resource according to the indication of the physical uplink shared channel transmission. In some examples, to support physical uplink shared channel transmission, the channel transmission component 840 may be configured as or otherwise support a means for transmitting a second portion of the physical uplink shared channel transmission using the second subset of the total number of sounding reference signal ports in the second sounding reference signal resource according to the indication of the physical uplink shared channel transmission.

In some examples, the ordering component 850 may be configured as or otherwise support a means for ordering the first subset of the total number of sounding reference signal ports and the second subset of the total number of sounding reference signal ports according to the indication of the physical uplink shared channel transmission, where transmitting the physical uplink shared channel transmission is based on the ordering.

In some examples, the precoding component 855 may be configured as or otherwise support a means for precoding the first portion of the physical uplink shared channel transmission for the first subset of the total number of sounding reference signal ports. In some examples, the precoding component 855 may be configured as or otherwise support a means for precoding, independently from the first portion of the physical uplink shared channel transmissions, the second portion of the physical uplink shared channel transmission for the second subset of the total number of sounding reference signal ports.

In some examples, the first sounding reference signal resource and the second sounding reference signal resource are located within a single symbol.

In some examples, the first sounding reference signal resource is located within a first symbol. In some examples, the second sounding reference signal resource is located within a second symbol.

In some examples, each codepoint of the sounding reference signal resource indicator field is associated with a respective candidate sounding reference signal port configuration. In some examples, a sum of the first subset of the total number of sounding reference signal ports and the second subset of the total number of sounding reference signal ports is equal to the total number of sounding reference signal ports.

In some examples, the resource set component 825 may be configured as or otherwise support a means for receiving, in the signaling configuring the sounding reference signal resource set including the set of multiple sounding reference signal resources, an indication of a third sounding reference signal resource of the set of multiple sounding reference signal resources that is associated with the total number of sounding reference signal ports supported by the UE, where transmitting the sounding reference signals is based on the indication of the third sounding reference signal resource of the set of multiple sounding reference signal resources.

In some examples, the third resource component 845 may be configured as or otherwise support a means for receiving signaling indicating whether the UE is to transmit the sounding reference signals via the third sounding reference signal resource, or a combination of the first sounding reference signal resource and the second sounding reference signal resource, where transmitting the sounding reference signals is based on the second signaling.

In some examples, to support indication of the physical uplink shared channel transmission, the downlink control information component 835 may be configured as or otherwise support a means for information in a sounding reference signal resource indicator field of the downlink control information message, and where each codepoint of the sounding reference signal resource indicator field is associated with a respective candidate sounding reference signal port configuration.

In some examples, to support transmitting the physical uplink shared channel transmission, the channel transmission component 840 may be configured as or otherwise support a means for transmitting the physical uplink shared channel transmission using the first subset of the total number of sounding reference signal ports in the first sounding reference signal resource according to the indication of the sounding reference signal port configuration.

In some examples, to support transmitting the physical uplink shared channel transmission, the channel transmission component 840 may be configured as or otherwise support a means for transmitting a first portion of the physical uplink shared channel transmission using the first subset of the total number of sounding reference signal ports in the first sounding reference signal resource according to the indication of the sounding reference signal port configuration. In some examples, to support transmitting the physical uplink shared channel transmission, the channel transmission component 840 may be configured as or otherwise support a means for transmitting a second portion of the physical uplink shared channel transmission using the second subset of the total number of sounding reference signal ports in the second sounding reference signal resource according to the indication of the sounding reference signal port configuration.

In some examples, to support transmitting the physical uplink shared channel transmission, the channel transmission component 840 may be configured as or otherwise support a means for transmitting the physical uplink shared channel transmission using the total number of sounding reference signal ports in the third sounding reference signal resource according to the indication of the physical uplink shared channel transmission.

Figure 9:
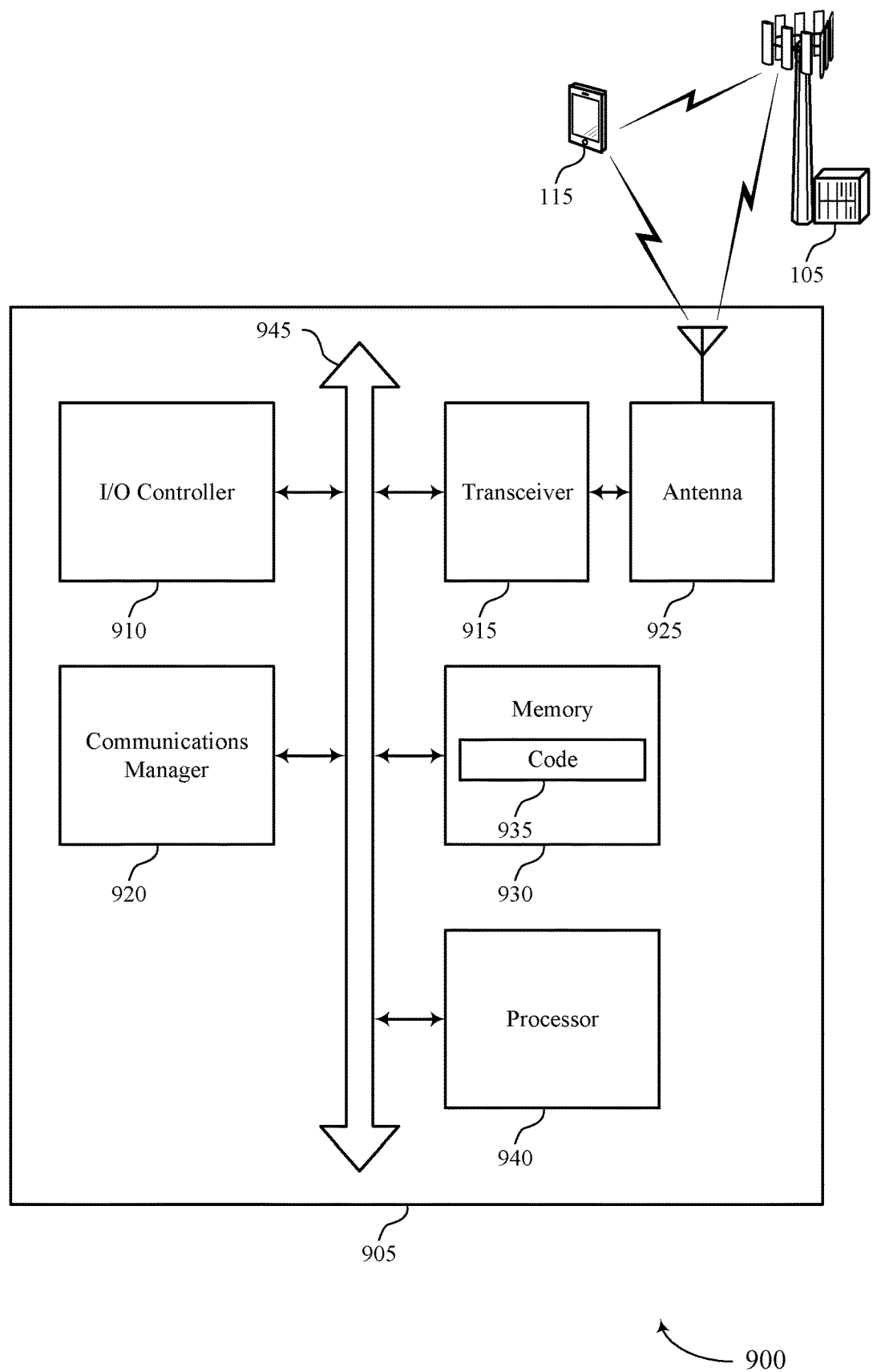
FIG. 9 shows a diagram of a system including a device that supports sounding reference signal resource configuration for transmission antenna ports in accordance with one or more aspects of the present disclosure.

FIG. 9 shows a diagram of a system 900 including a device 905 that supports sounding reference signal resource configuration for transmission antenna ports in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting sounding reference signal resource configuration for transmission antenna ports, such as up to eight transmission antenna ports). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving signaling configuring a sounding reference signal resource set including a first sounding reference signal resource of a set of multiple sounding reference signal resources that is associated with a first subset of a total number of sounding reference signal ports supported by the UE and a second sounding reference signal resource of the set of multiple sounding reference signal resources that is associated with a second subset of the total number of sounding reference signal ports supported by the UE. The communications manager 920 may be configured as or otherwise support a means for transmitting sounding reference signals via at least one sounding reference signal resource of the set of multiple sounding reference signal resources based on the signaling configuring a sounding reference signal resource set. The communications manager 920 may be configured as or otherwise support a means for receiving a downlink control information message including an indication of a physical uplink shared channel transmission based on at least a subset of the total number of sounding reference signal ports. The communications manager 920 may be configured as or otherwise support a means for transmitting the physical uplink shared channel transmission based on at least the subset of the total number of sounding reference signal ports.

By including or configuring the communications manager 920 in accordance with examples as described herein, the device 905 may support techniques for SRS procedures resulting in increased throughput, reduced latency, and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of sounding reference signal resource configuration for transmission antenna ports as described herein, or the processor 940 and the memory 930 may be otherwise configured to perform or support such operations.

Figure 10:
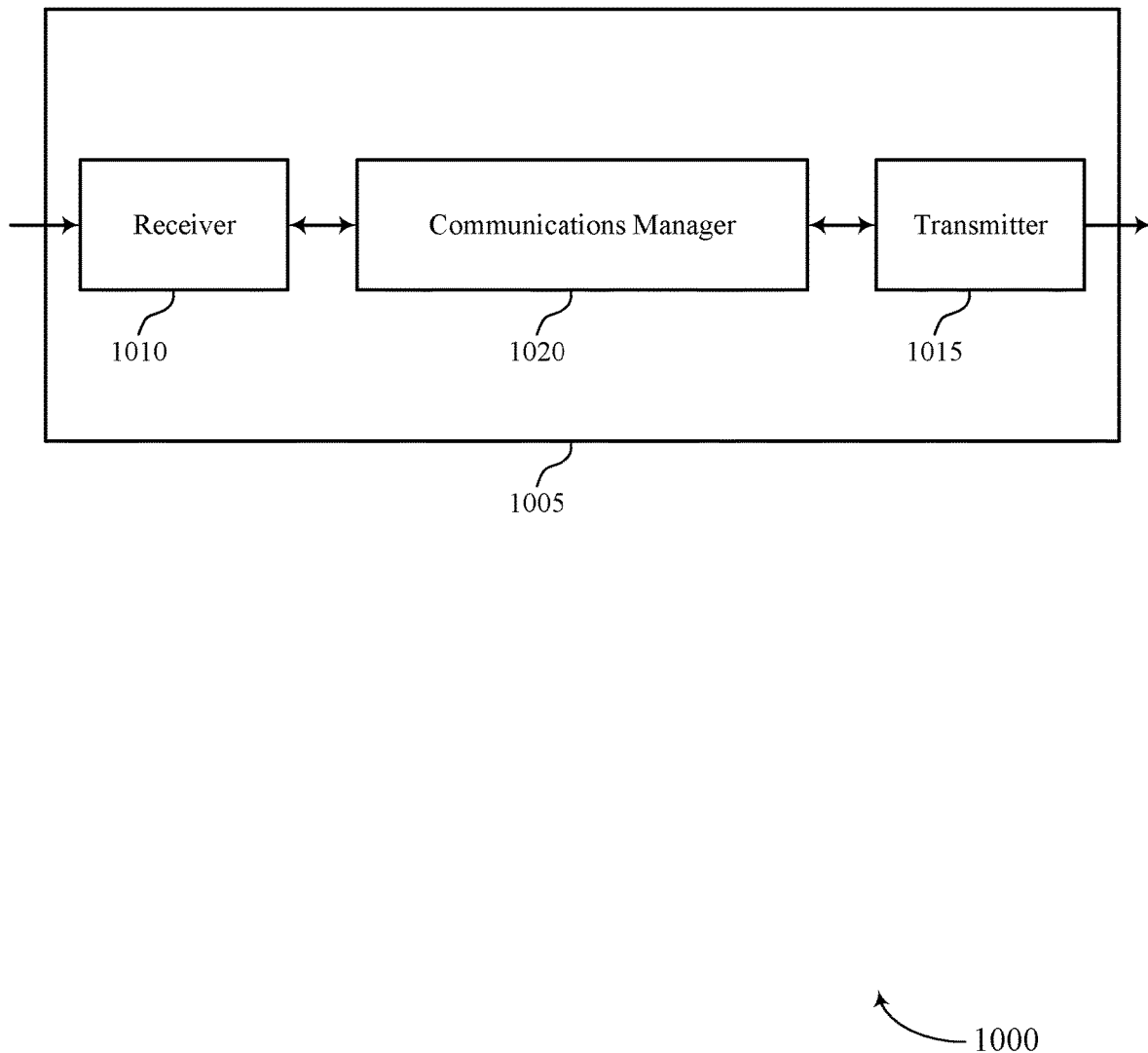
FIGS. 10 and 11 show block diagrams of devices that support sounding reference signal resource configuration for transmission antenna ports in accordance with one or more aspects of the present disclosure.

FIG. 10 shows a block diagram 1000 of a device 1005 that supports sounding reference signal resource configuration for transmission antenna ports in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of sounding reference signal resource configuration for transmission antenna ports as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for outputting signaling configuring a sounding reference signal resource set including a set of multiple sounding reference signal resources, where a first sounding reference signal resource of the set of multiple sounding reference signal resources is associated with a first subset of a total number of sounding reference signal ports supported by a UE and a second sounding reference signal resource of the set of multiple sounding reference signal resources is associated with a second subset of the total number of sounding reference signal ports supported by the UE. The communications manager 1020 may be configured as or otherwise support a means for obtaining sounding reference signals via at least one sounding reference signal resource of the set of multiple sounding reference signal resources based on the signaling configuring a sounding reference signal resource set. The communications manager 1020 may be configured as or otherwise support a means for outputting a downlink control information message including an indication of a physical uplink shared channel transmission based on at least a subset of the total number of sounding reference signal ports. The communications manager 1020 may be configured as or otherwise support a means for receiving the physical uplink shared channel transmission based on at least the subset of the total number of sounding reference signal ports.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for SRS procedures resulting in more efficient utilization of communication resources, decreased latency, and improved user experience.

Figure 11:
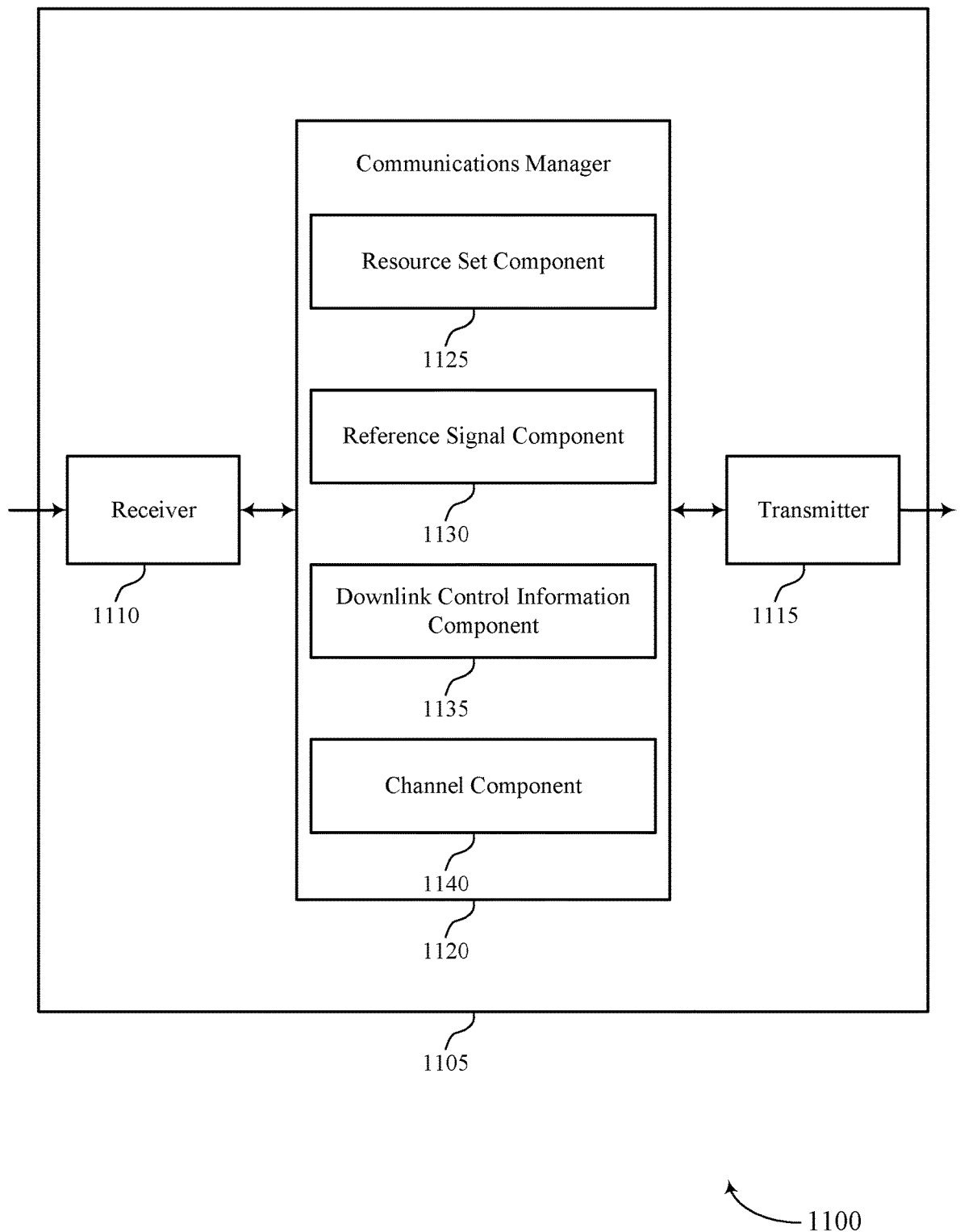

FIG. 11 shows a block diagram 1100 of a device 1105 that supports sounding reference signal resource configuration for transmission antenna ports in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of sounding reference signal resource configuration for transmission antenna ports as described herein. For example, the communications manager 1120 may include a resource set component 1125, a reference signal component 1130, a downlink control information component 1135, a channel component 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The resource set component 1125 may be configured as or otherwise support a means for outputting signaling configuring a sounding reference signal resource set including a set of multiple sounding reference signal resources, where a first sounding reference signal resource of the set of multiple sounding reference signal resources is associated with a first subset of a total number of sounding reference signal ports supported by a UE and a second sounding reference signal resource of the set of multiple sounding reference signal resources is associated with a second subset of the total number of sounding reference signal ports supported by the UE. The reference signal component 1130 may be configured as or otherwise support a means for obtaining sounding reference signals via at least one sounding reference signal resource of the set of multiple sounding reference signal resources based on the signaling configuring a sounding reference signal resource set. The downlink control information component 1135 may be configured as or otherwise support a means for outputting a downlink control information message including an indication of a physical uplink shared channel transmission based on at least a subset of the total number of sounding reference signal ports. The channel component 1140 may be configured as or otherwise support a means for receiving the physical uplink shared channel transmission based on at least the subset of the total number of sounding reference signal ports.

Figure 12:
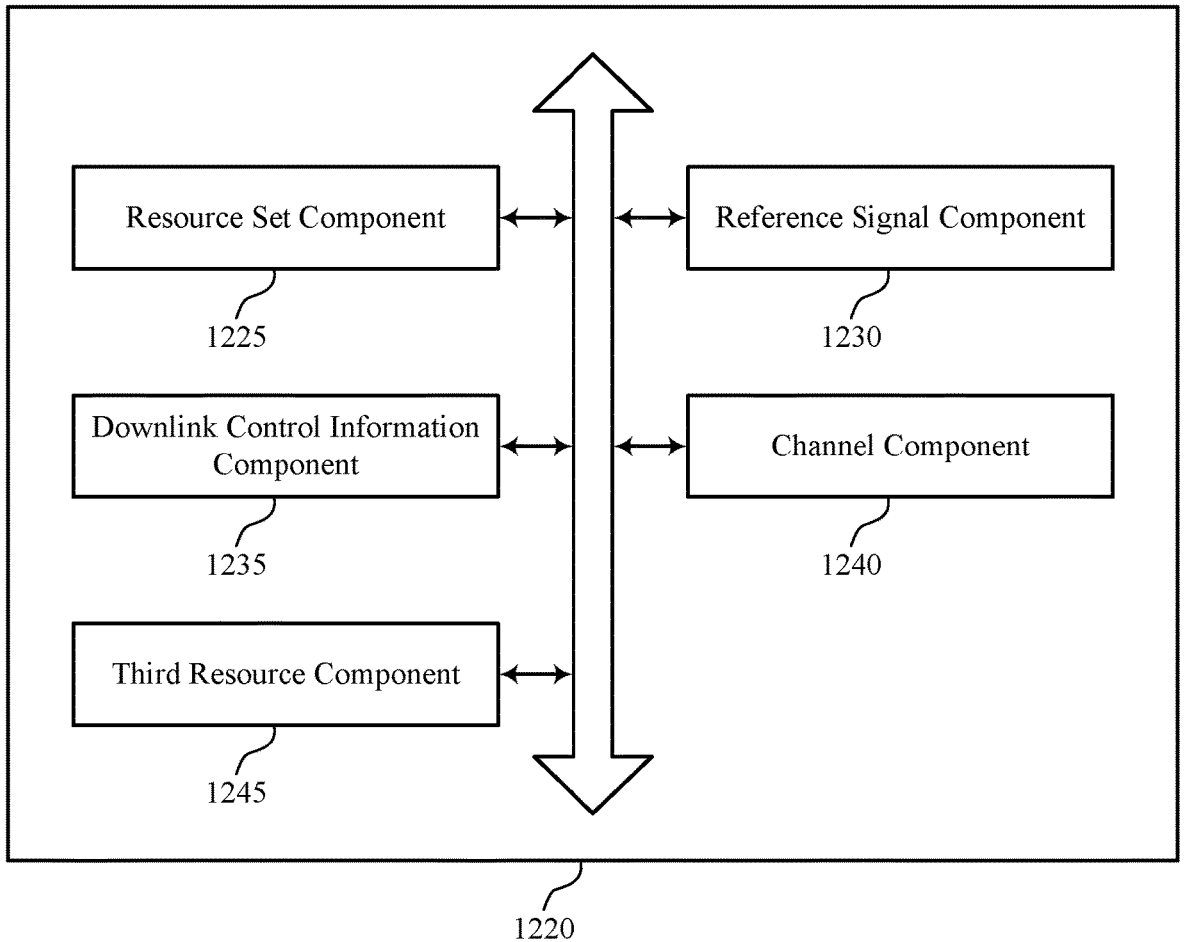
FIG. 12 shows a block diagram of a communications manager that supports sounding reference signal resource configuration for transmission antenna ports in accordance with one or more aspects of the present disclosure.

FIG. 12 shows a block diagram 1200 of a communications manager 1220 that supports sounding reference signal resource configuration for transmission antenna ports in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of sounding reference signal resource configuration for transmission antenna ports as described herein. For example, the communications manager 1220 may include a resource set component 1225, a reference signal component 1230, a downlink control information component 1235, a channel component 1240, a third resource component 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The resource set component 1225 may be configured as or otherwise support a means for outputting signaling configuring a sounding reference signal resource set including a set of multiple sounding reference signal resources, where a first sounding reference signal resource of the set of multiple sounding reference signal resources is associated with a first subset of a total number of sounding reference signal ports supported by a UE and a second sounding reference signal resource of the set of multiple sounding reference signal resources is associated with a second subset of the total number of sounding reference signal ports supported by the UE. The reference signal component 1230 may be configured as or otherwise support a means for obtaining sounding reference signals via at least one sounding reference signal resource of the set of multiple sounding reference signal resources based on the signaling configuring a sounding reference signal resource set. The downlink control information component 1235 may be configured as or otherwise support a means for outputting a downlink control information message including an indication of a physical uplink shared channel transmission based on at least a subset of the total number of sounding reference signal ports. The channel component 1240 may be configured as or otherwise support a means for receiving the physical uplink shared channel transmission based on at least the subset of the total number of sounding reference signal ports.

In some examples, to support indication of the physical uplink shared channel transmission, the downlink control information component 1235 may be configured as or otherwise support a means for information in a sounding reference signal resource indicator field of the downlink control information message.

In some examples, each codepoint of the sounding reference signal resource indicator field is associated with a respective candidate sounding reference signal port configuration. In some examples, a sum of the first subset of the total number of sounding reference signal ports and the second subset of the total number of sounding reference signal ports is equal to the total number of sounding reference signal ports.

In some examples, to support receiving the physical uplink shared channel transmission, the channel component 1240 may be configured as or otherwise support a means for receiving physical uplink shared channel transmission using the first subset of the total number of sounding reference signal ports in the first sounding reference signal resource according to the indication of the physical uplink shared channel transmission.

In some examples, to support receiving the physical uplink shared channel transmission, the channel component 1240 may be configured as or otherwise support a means for receiving a first portion of the physical uplink shared channel transmission using the first subset of the total number of sounding reference signal ports in the first sounding reference signal resource according to the indication of the physical uplink shared channel transmission. In some examples, to support receiving the physical uplink shared channel transmission, the channel component 1240 may be configured as or otherwise support a means for receiving a second portion of the physical uplink shared channel transmission using the second subset of the total number of sounding reference signal ports in the second sounding reference signal resource according to the indication of the physical uplink shared channel transmission.

In some examples, the first sounding reference signal resource and the second sounding reference signal resource are located within a single symbol.

In some examples, the first sounding reference signal resource is located within a first symbol. In some examples, the second sounding reference signal resource is located within a second symbol.

In some examples, the third resource component 1245 may be configured as or otherwise support a means for outputting, in the signaling configuring the sounding reference signal resource set including the set of multiple sounding reference signal resources, an indication of a third sounding reference signal resource of the set of multiple sounding reference signal resources that is associated with the total number of sounding reference signal ports supported by the UE, where obtaining the sounding reference signals is based on the indication of the third sounding reference signal resource of the set of multiple sounding reference signal resources.

In some examples, the third resource component 1245 may be configured as or otherwise support a means for outputting second signaling indicating whether the UE is to transmit the sounding reference signals via the third sounding reference signal resource, or a combination of the first sounding reference signal resource and the second sounding reference signal resource, where obtaining the sounding reference signals is based on the second signaling.

In some examples, to support indication of the physical uplink shared channel transmission, the downlink control information component 1235 may be configured as or otherwise support a means for information in a sounding reference signal resource indicator field of the downlink control information message, and where each codepoint of the sounding reference signal resource indicator field is associated with a respective candidate sounding reference signal port configuration.

In some examples, to support receiving the physical uplink shared channel transmission, the channel component 1240 may be configured as or otherwise support a means for receiving the physical uplink shared channel transmission using the first subset of the total number of sounding reference signal ports in the first sounding reference signal resource according to the indication of the sounding reference signal port configuration.

Figure 13:
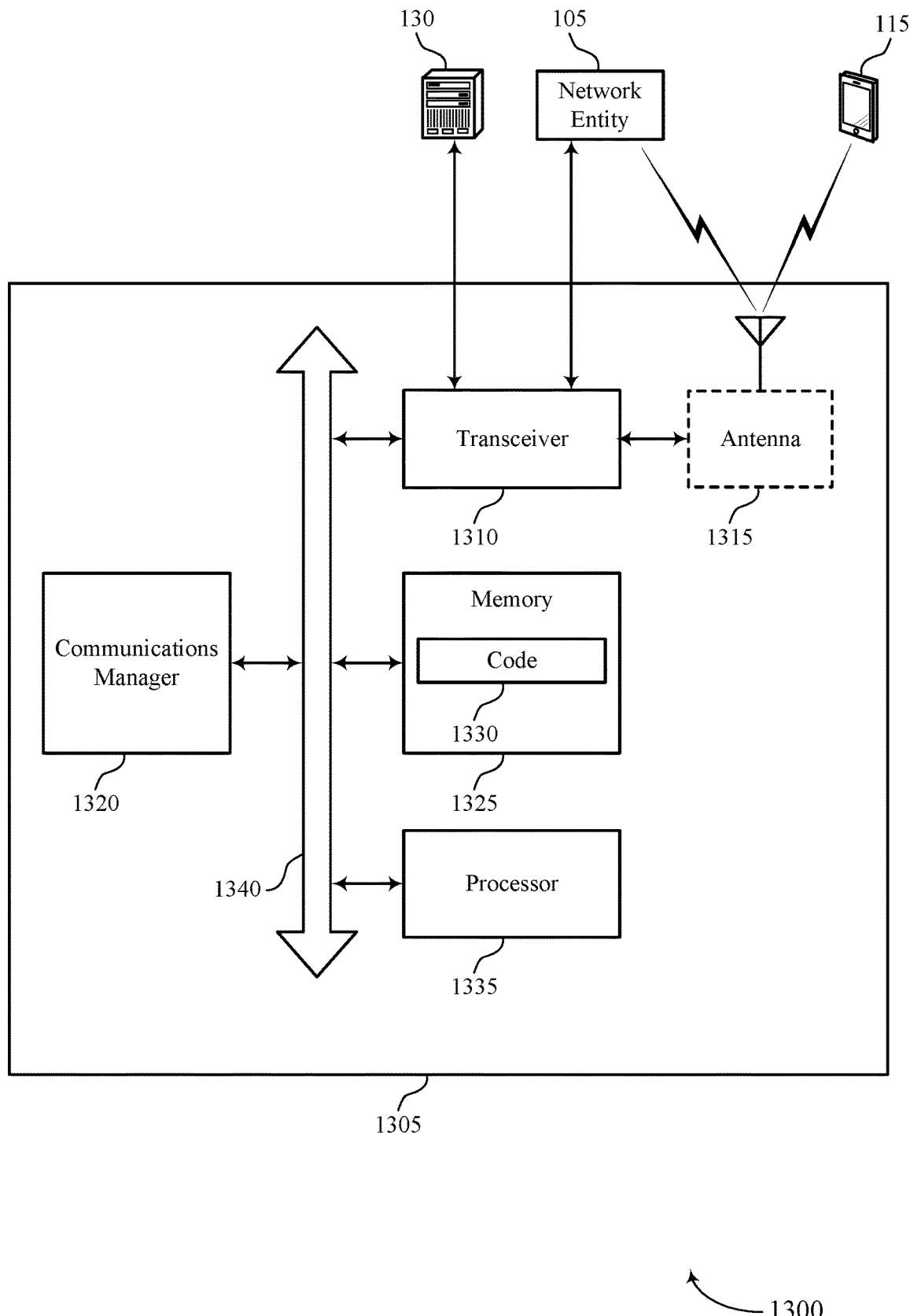
FIG. 13 shows a diagram of a system including a device that supports sounding reference signal resource configuration for transmission antenna ports in accordance with one or more aspects of the present disclosure.

FIG. 13 shows a diagram of a system 1300 including a device 1305 that supports sounding reference signal resource configuration for transmission antenna ports in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor

1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting sounding reference signal resource configuration for transmission antenna ports, such as up to eight transmission antenna ports). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with ULEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for outputting signaling configuring a sounding reference signal resource set including a set of multiple sounding reference signal resources, where a first sounding reference signal resource of the set of multiple sounding reference signal resources is associated with a first subset of a total number of sounding reference signal ports supported by a UE and a second sounding reference signal resource of the set of multiple sounding reference signal resources is associated with a second subset of the total number of sounding reference signal ports supported by the UE. The communications manager 1320 may be configured as or otherwise support a means for obtaining sounding reference signals via at least one sounding reference signal resource of the set of multiple sounding reference signal resources based on the signaling configuring a sounding reference signal resource set. The communications manager 1320 may be configured as or otherwise support a means for outputting a downlink control information message including an indication of a physical uplink shared channel transmission based on at least a subset of the total number of sounding reference signal ports. The communications manager 1320 may be configured as or otherwise support a means for receiving the physical uplink shared channel transmission based on at least the subset of the total number of sounding reference signal ports.

By including or configuring the communications manager 1320 in accordance with examples as described herein, the device 1305 may support techniques for SRS procedures resulting in increased throughput, reduced latency, and more efficient utilization of communication resources.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of sounding reference signal resource configuration for transmission antenna ports as described herein, or the processor 1335 and the memory 1325 may be otherwise configured to perform or support such operations.

Figure 14:
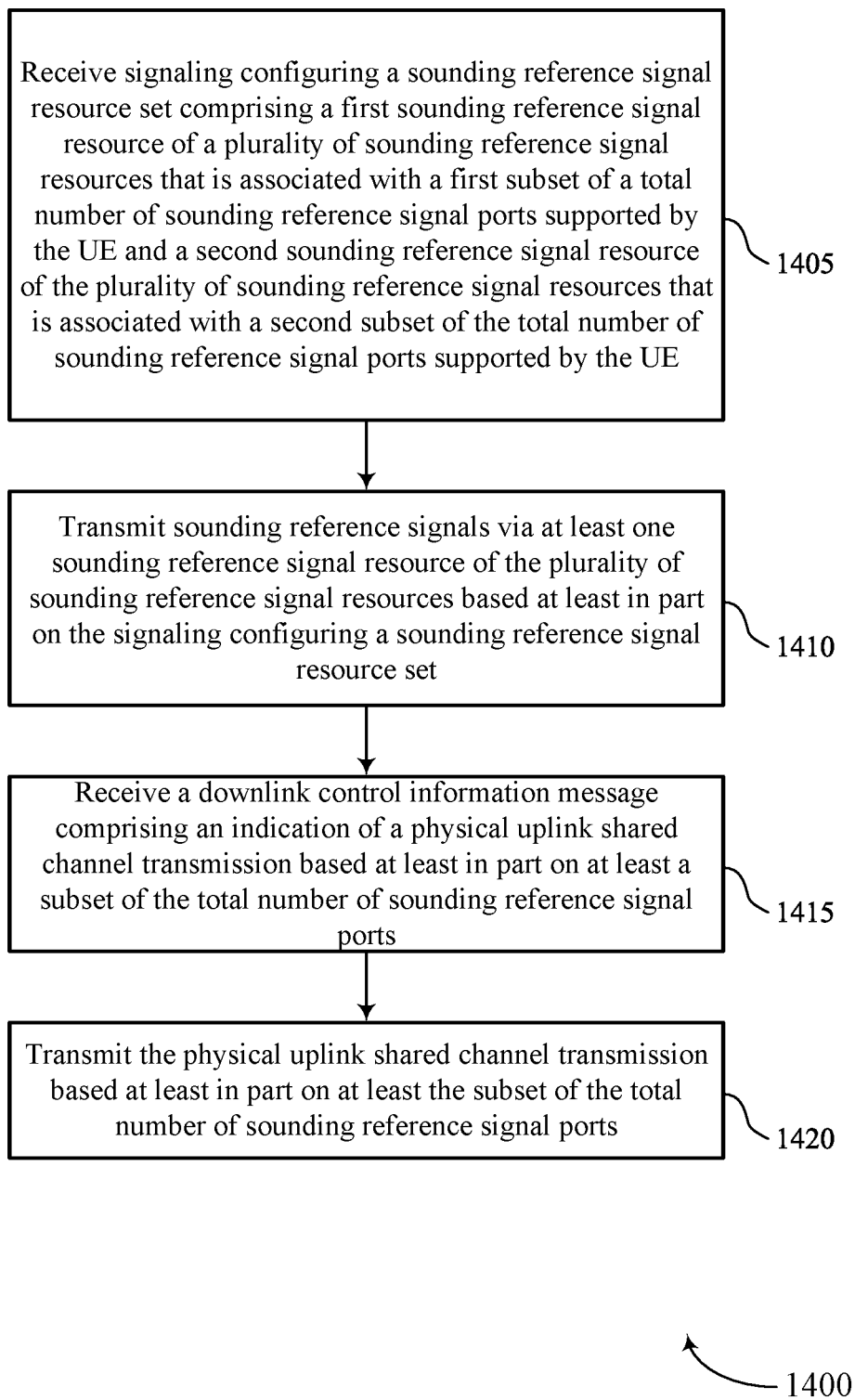
FIGS. 14 through 17 show flowcharts illustrating methods that support sounding reference signal resource configuration for transmission antenna ports in accordance with one or more aspects of the present disclosure.

FIG. 14 shows a flowchart illustrating a method 1400 that supports sounding reference signal resource configuration for transmission antenna ports in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving signaling configuring a sounding reference signal resource set including a first sounding reference signal resource of a set of multiple sounding reference signal resources that is associated with a first subset of a total number of sounding reference signal ports supported by the UE and a second sounding reference signal resource of the set of multiple sounding reference signal resources that is associated with a second subset of the total number of sounding reference signal ports supported by the UE. The operations of 1405 may be performed in accordance with examples as disclosed herein. In some examples, aspects of the operations of 1405 may be performed by a resource set component 825 as described with reference to FIG. 8.

At 1410, the method may include transmitting sounding reference signals via at least one sounding reference signal resource of the set of multiple sounding reference signal resources based on the signaling configuring a sounding reference signal resource set. The operations of 1410 may be performed in accordance with examples as disclosed herein. In some examples, aspects of the operations of 1410 may be performed by a reference signal transmission component 830 as described with reference to FIG. 8.

At 1415, the method may include receiving a downlink control information message including an indication of a physical uplink shared channel transmission based on at least a subset of the total number of sounding reference signal ports. The operations of 1415 may be performed in accordance with examples as disclosed herein. In some examples, aspects of the operations of 1415 may be performed by a downlink control information component 835 as described with reference to FIG. 8.

At 1420, the method may include transmitting the physical uplink shared channel transmission based on at least the subset of the total number of sounding reference signal ports. The operations of 1420 may be performed in accordance with examples as disclosed herein. In some examples, aspects of the operations of 1420 may be performed by a channel transmission component 840 as described with reference to FIG. 8.

Figure 15:
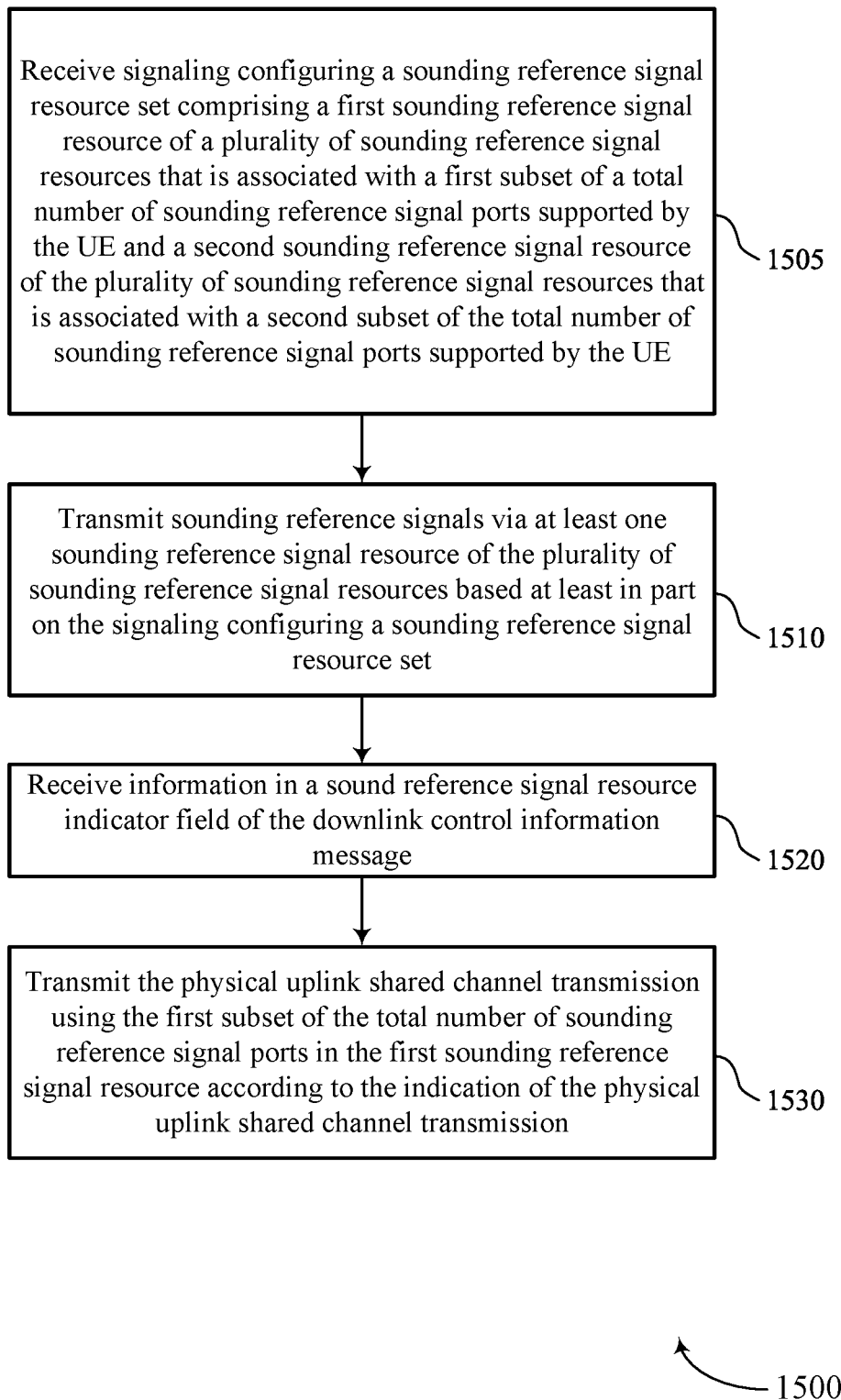

FIG. 15 shows a flowchart illustrating a method 1500 that supports sounding reference signal resource configuration for transmission antenna ports in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving signaling configuring a sounding reference signal resource set including a first sounding reference signal resource of a set of multiple sounding reference signal resources that is associated with a first subset of a total number of sounding reference signal ports supported by the UE and a second sounding reference signal resource of the set of multiple sounding reference signal resources that is associated with a second subset of the total number of sounding reference signal ports supported by the UE. The operations of 1505 may be performed in accordance with examples as disclosed herein. In some examples, aspects of the operations of 1505 may be performed by a resource set component 825 as described with reference to FIG. 8.

At 1510, the method may include transmitting sounding reference signals via at least one sounding reference signal resource of the set of multiple sounding reference signal resources based on the signaling configuring a sounding reference signal resource set. The operations of 1510 may be performed in accordance with examples as disclosed herein. In some examples, aspects of the operations of 1510 may be performed by a reference signal transmission component 830 as described with reference to FIG. 8.

At 1515, the method may include receiving a downlink control information message including an indication of a physical uplink shared channel transmission based on at least a subset of the total number of sounding reference signal ports. The operations of 1515 may be performed in accordance with examples as disclosed herein. In some examples, aspects of the operations of 1515 may be performed by a downlink control information component 835 as described with reference to FIG. 8.

At 1520, the method may include information in a sounding reference signal resource indicator field of the downlink control information message. The operations of 1520 may be performed in accordance with examples as disclosed herein. In some examples, aspects of the operations of 1520 may be performed by a downlink control information component 835 as described with reference to FIG. 8.

At 1525, the method may include transmitting the physical uplink shared channel transmission based on at least the subset of the total number of sounding reference signal ports. The operations of 1525 may be performed in accordance with examples as disclosed herein. In some examples, aspects of the operations of 1525 may be performed by a channel transmission component 840 as described with reference to FIG. 8.

At 1530, the method may include transmitting the physical uplink shared channel transmission using the first subset of the total number of sounding reference signal ports in the first sounding reference signal resource according to the indication of the physical uplink shared channel transmission. The operations of 1530 may be performed in accordance with examples as disclosed herein. In some examples, aspects of the operations of 1530 may be performed by a channel transmission component 840 as described with reference to FIG. 8.

Figure 16:
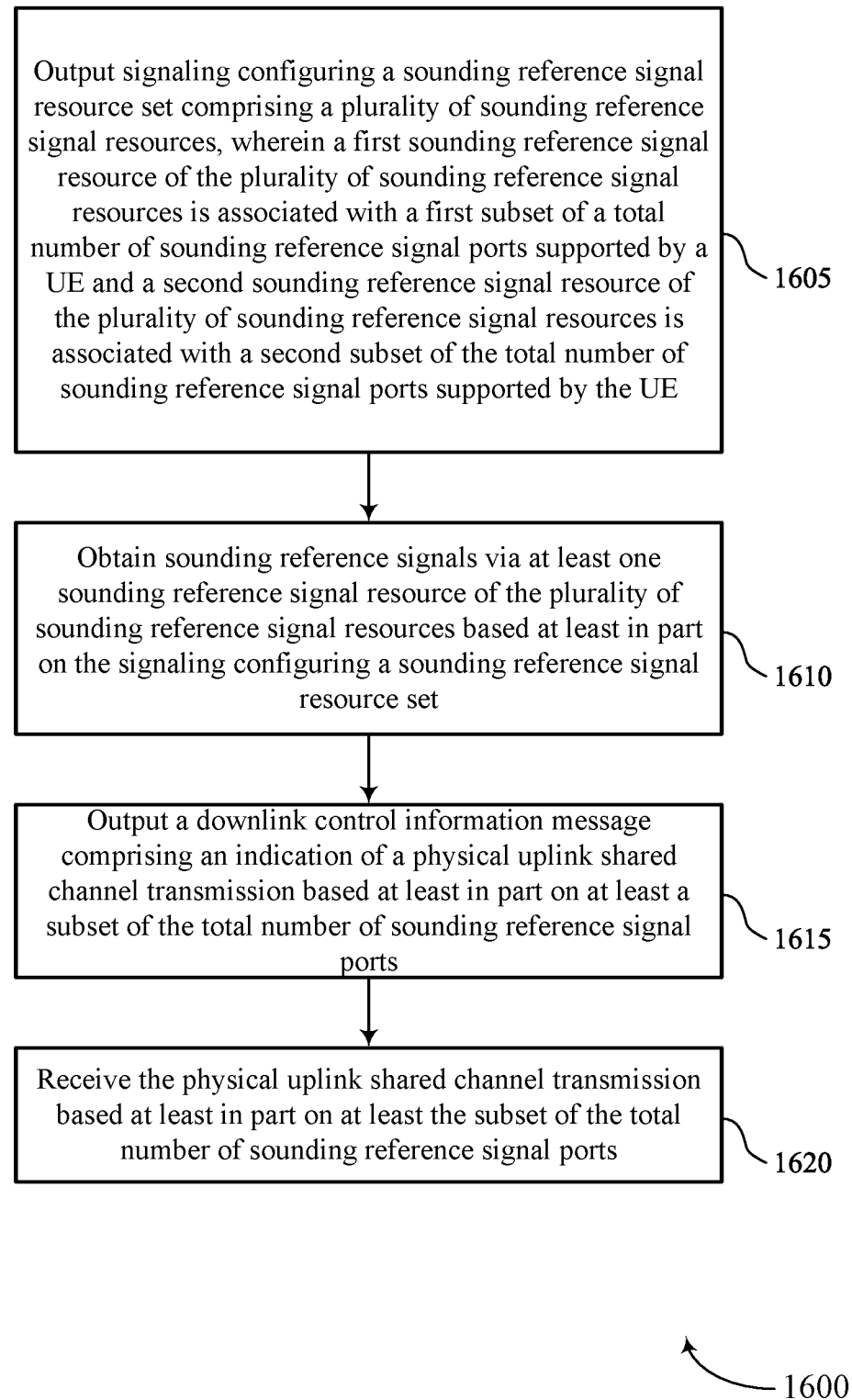

FIG. 16 shows a flowchart illustrating a method 1600 that supports sounding reference signal resource configuration for transmission antenna ports in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include outputting signaling configuring a sounding reference signal resource set including a set of multiple sounding reference signal resources, where a first sounding reference signal resource of the set of multiple sounding reference signal resources is associated with a first subset of a total number of sounding reference signal ports supported by a UE and a second sounding reference signal resource of the set of multiple sounding reference signal resources is associated with a second subset of the total number of sounding reference signal ports supported by the UE. The operations of 1605 may be performed in accordance with examples as disclosed herein. In some examples, aspects of the operations of 1605 may be performed by a resource set component 1225 as described with reference to FIG. 12.

At 1610, the method may include obtaining sounding reference signals via at least one sounding reference signal resource of the set of multiple sounding reference signal resources based on the signaling configuring a sounding reference signal resource set. The operations of 1610 may be performed in accordance with examples as disclosed herein. In some examples, aspects of the operations of 1610 may be performed by a reference signal component 1230 as described with reference to FIG. 12.

At 1615, the method may include outputting a downlink control information message including an indication of a physical uplink shared channel transmission based on at least a subset of the total number of sounding reference signal ports. The operations of 1615 may be performed in accordance with examples as disclosed herein. In some examples, aspects of the operations of 1615 may be performed by a downlink control information component 1235 as described with reference to FIG. 12.

At 1620, the method may include receiving the physical uplink shared channel transmission based on at least the subset of the total number of sounding reference signal ports. The operations of 1620 may be performed in accordance with examples as disclosed herein. In some examples, aspects of the operations of 1620 may be performed by a channel component 1240 as described with reference to FIG. 12.

Figure 17:
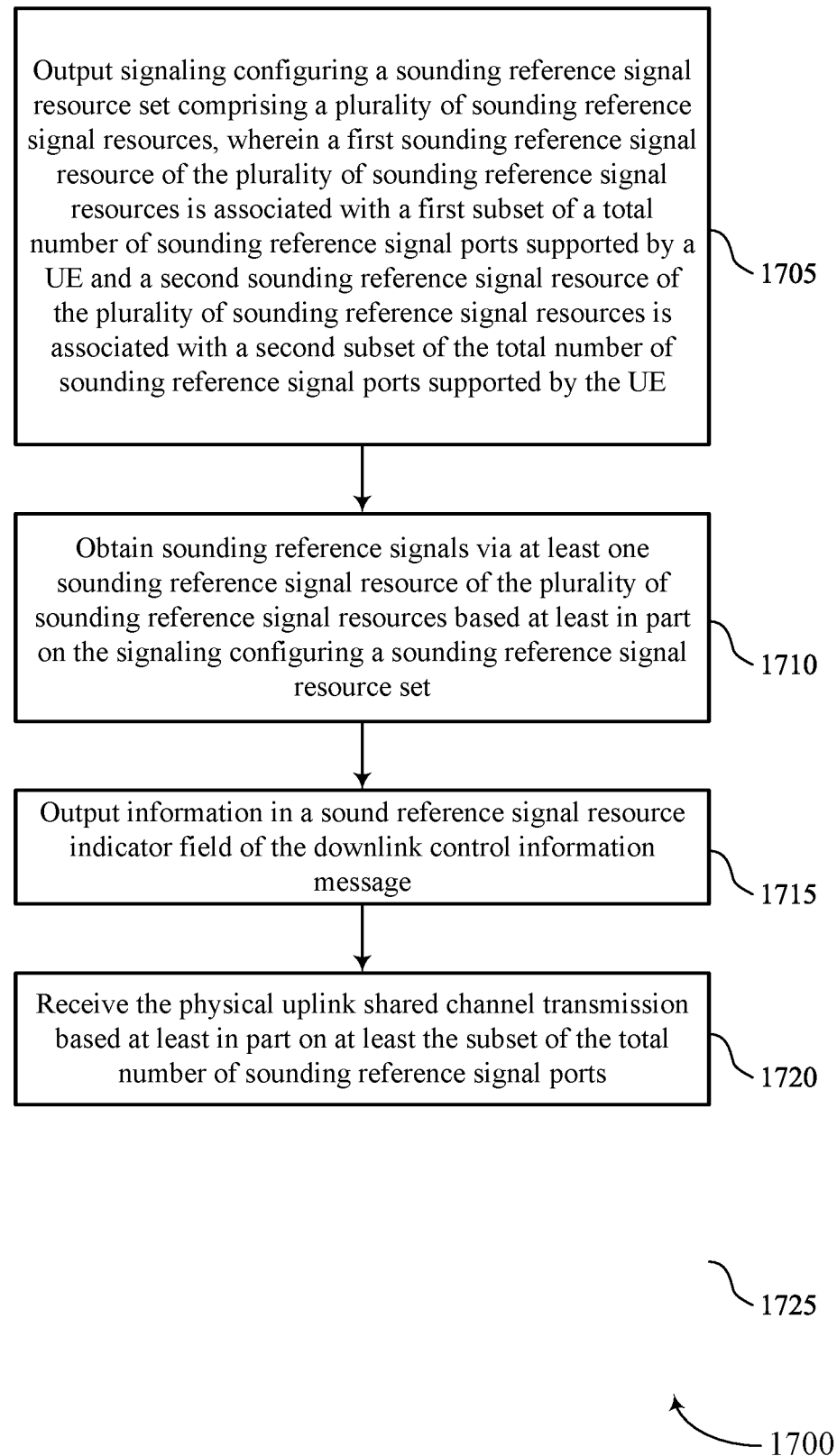

FIG. 17 shows a flowchart illustrating a method 1700 that supports sounding reference signal resource configuration for transmission antenna ports in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting signaling configuring a sounding reference signal resource set including a set of multiple sounding reference signal resources, where a first sounding reference signal resource of the set of multiple sounding reference signal resources is associated with a first subset of a total number of sounding reference signal ports supported by a UE and a second sounding reference signal resource of the set of multiple sounding reference signal resources is associated with a second subset of the total number of sounding reference signal ports supported by the UE. The operations of 1705 may be performed in accordance with examples as disclosed herein. In some examples, aspects of the operations of 1705 may be performed by a resource set component 1225 as described with reference to FIG. 12.

At 1710, the method may include obtaining sounding reference signals via at least one sounding reference signal resource of the set of multiple sounding reference signal resources based on the signaling configuring a sounding reference signal resource set. The operations of 1710 may be performed in accordance with examples as disclosed herein. In some examples, aspects of the operations of 1710 may be performed by a reference signal component 1230 as described with reference to FIG. 12.

At 1715, the method may include outputting a downlink control information message including an indication of a physical uplink shared channel transmission based on at least a subset of the total number of sounding reference signal ports. The operations of 1715 may be performed in accordance with examples as disclosed herein. In some examples, aspects of the operations of 1715 may be performed by a downlink control information component 1235 as described with reference to FIG. 12.

At 1720, the method may include information in a sounding reference signal resource indicator field of the downlink control information message. The operations of 1720 may be performed in accordance with examples as disclosed herein. In some examples, aspects of the operations of 1720 may be performed by a downlink control information component 1235 as described with reference to FIG. 12.

At 1725, the method may include receiving the physical uplink shared channel transmission based on at least the subset of the total number of sounding reference signal ports. The operations of 1725 may be performed in accordance with examples as disclosed herein. In some examples, aspects of the operations of 1725 may be performed by a channel component 1240 as described with reference to FIG. 12.

The following provides an overview of aspects of the present disclosure:

Aspect 1: A method for wireless communications at a UE, comprising: receiving signaling configuring a sounding reference signal resource set comprising a first sounding reference signal resource of a plurality of sounding reference signal resources that is associated with a first subset of a total number of sounding reference signal ports supported by the UE and a second sounding reference signal resource of the plurality of sounding reference signal resources that is associated with a second subset of the total number of sounding reference signal ports supported by the UE; transmitting sounding reference signals via at least one sounding reference signal resource of the plurality of sounding reference signal resources based at least in part on the signaling configuring a sounding reference signal resource set; receiving a downlink control information message comprising an indication of a physical uplink shared channel transmission based at least in part on at least a subset of the total number of sounding reference signal ports; and transmitting the physical uplink shared channel transmission based at least in part on at least the subset of the total number of sounding reference signal ports.

Aspect 2: The method of aspect 1, wherein the indication of the physical uplink shared channel transmission comprises: information in a sounding reference signal resource indicator field of the downlink control information message.

Aspect 3: The method of aspect 2, wherein transmitting the physical uplink shared channel transmission comprises: transmitting the physical uplink shared channel transmission using the first subset of the total number of sounding reference signal ports in the first sounding reference signal resource according to the indication of the physical uplink shared channel transmission.

Aspect 4: The method of any of aspects 2 through 3, wherein the physical uplink shared channel transmission comprises: transmitting a first portion of the physical uplink shared channel transmission using the first subset of the total number of sounding reference signal ports in the first sounding reference signal resource according to the indication of the physical uplink shared channel transmission; and transmitting a second portion of the physical uplink shared channel transmission using the second subset of the total number of sounding reference signal ports in the second sounding reference signal resource according to the indication of the physical uplink shared channel transmission.

Aspect 5: The method of aspect 4, further comprising: ordering the first subset of the total number of sounding reference signal ports and the second subset of the total number of sounding reference signal ports according to the indication of the physical uplink shared channel transmission, wherein transmitting the physical uplink shared channel transmission is based at least in part on the ordering.

Aspect 6: The method of any of aspects 4 through 5, further comprising: precoding the first portion of the physical uplink shared channel transmission for the first subset of the total number of sounding reference signal ports; and precoding, independently from the first portion of the physical uplink shared channel transmissions, the second portion of the physical uplink shared channel transmission for the second subset of the total number of sounding reference signal ports.

Aspect 7: The method of any of aspects 2 through 6, wherein the first sounding reference signal resource and the second sounding reference signal resource are located within a single symbol.

Aspect 8: The method of any of aspects 2 through 7, wherein the first sounding reference signal resource is located within a first symbol; and the second sounding reference signal resource is located within a second symbol.

Aspect 9: The method of any of aspects 2 through 8, wherein each codepoint of the sounding reference signal resource indicator field is associated with a respective candidate sounding reference signal port configuration, and a sum of the first subset of the total number of sounding reference signal ports and the second subset of the total number of sounding reference signal ports is equal to the total number of sounding reference signal ports.

Aspect 10: The method of any of aspects 1 through 9, further comprising: receiving, in the signaling configuring the sounding reference signal resource set comprising the plurality of sounding reference signal resources, an indication of a third sounding reference signal resource of the plurality of sounding reference signal resources that is associated with the total number of sounding reference signal ports supported by the UE, wherein transmitting the sounding reference signals is based at least in part on the indication of the third sounding reference signal resource of the plurality of sounding reference signal resources.

Aspect 11: The method of aspect 10, further comprising: receiving signaling indicating whether the UE is to transmit the sounding reference signals via the third sounding reference signal resource, or a combination of the first sounding reference signal resource and the second sounding reference signal resource, wherein transmitting the sounding reference signals is based at least in part on the second signaling.

Aspect 12: The method of any of aspects 10 through 11, wherein the indication of the physical uplink shared channel transmission comprises: information in a sounding reference signal resource indicator field of the downlink control information message, and wherein each codepoint of the sounding reference signal resource indicator field is associated with a respective candidate sounding reference signal port configuration.

Aspect 13: The method of aspect 12, wherein transmitting the physical uplink shared channel transmission comprises: transmitting the physical uplink shared channel transmission using the first subset of the total number of sounding reference signal ports in the first sounding reference signal resource according to the indication of the sounding reference signal port configuration.

Aspect 14: The method of any of aspects 12 through 13, wherein transmitting the physical uplink shared channel transmission comprises: transmitting a first portion of the physical uplink shared channel transmission using the first subset of the total number of sounding reference signal ports in the first sounding reference signal resource according to the indication of the sounding reference signal port configuration; and transmitting a second portion of the physical uplink shared channel transmission using the second subset of the total number of sounding reference signal ports in the second sounding reference signal resource according to the indication of the sounding reference signal port configuration.

Aspect 15: The method of any of aspects 12 through 14, wherein transmitting the physical uplink shared channel transmission comprises: transmitting the physical uplink shared channel transmission using the total number of sounding reference signal ports in the third sounding reference signal resource according to the indication of the physical uplink shared channel transmission.

Aspect 16: A method for wireless communications at a network entity, comprising: outputting signaling configuring a sounding reference signal resource set comprising a plurality of sounding reference signal resources, wherein a first sounding reference signal resource of the plurality of sounding reference signal resources is associated with a first subset of a total number of sounding reference signal ports supported by a UE and a second sounding reference signal resource of the plurality of sounding reference signal resources is associated with a second subset of the total number of sounding reference signal ports supported by the UE; obtaining sounding reference signals via at least one sounding reference signal resource of the plurality of sounding reference signal resources based at least in part on the signaling configuring a sounding reference signal resource set; outputting a downlink control information message comprising an indication of a physical uplink shared channel transmission based at least in part on at least a subset of the total number of sounding reference signal ports; and receiving the physical uplink shared channel transmission based at least in part on at least the subset of the total number of sounding reference signal ports.

Aspect 17: The method of aspect 16, wherein the indication of the physical uplink shared channel transmission comprises: information in a sounding reference signal resource indicator field of the downlink control information message.

Aspect 18: The method of aspect 17, wherein each codepoint of the sounding reference signal resource indicator field is associated with a respective candidate sounding reference signal port configuration, and a sum of the first subset of the total number of sounding reference signal ports and the second subset of the total number of sounding reference signal ports is equal to the total number of sounding reference signal ports.

Aspect 19: The method of any of aspects 16 through 18, wherein receiving the physical uplink shared channel transmission comprises: receiving physical uplink shared channel transmission using the first subset of the total number of sounding reference signal ports in the first sounding reference signal resource according to the indication of the physical uplink shared channel transmission.

Aspect 20: The method of any of aspects 16 through 19, wherein receiving the physical uplink shared channel transmission comprises: receiving a first portion of the physical uplink shared channel transmission using the first subset of the total number of sounding reference signal ports in the first sounding reference signal resource according to the indication of the physical uplink shared channel transmission; and receiving a second portion of the physical uplink shared channel transmission using the second subset of the total number of sounding reference signal ports in the second sounding reference signal resource according to the indication of the physical uplink shared channel transmission.

Aspect 21: The method of any of aspects 16 through 20, wherein the first sounding reference signal resource and the second sounding reference signal resource are located within a single symbol.

Aspect 22: The method of any of aspects 16 through 21, wherein the first sounding reference signal resource is located within a first symbol; and the second sounding reference signal resource is located within a second symbol.

Aspect 23: The method of any of aspects 16 through 22, further comprising: outputting, in the signaling configuring the sounding reference signal resource set comprising the plurality of sounding reference signal resources, an indication of a third sounding reference signal resource of the plurality of sounding reference signal resources that is associated with the total number of sounding reference signal ports supported by the UE, wherein obtaining the sounding reference signals is based at least in part on the indication of the third sounding reference signal resource of the plurality of sounding reference signal resources.

Aspect 24: The method of aspect 23, further comprising: outputting second signaling indicating whether the UE is to transmit the sounding reference signals via the third sounding reference signal resource, or a combination of the first sounding reference signal resource and the second sounding reference signal resource, wherein obtaining the sounding reference signals is based at least in part on the second signaling.

Aspect 25: The method of any of aspects 23 through 24, wherein the indication of the physical uplink shared channel transmission comprises: information in a sounding reference signal resource indicator field of the downlink control information message, and wherein each codepoint of the sounding reference signal resource indicator field is associated with a respective candidate sounding reference signal port configuration.

Aspect 26: The method of aspect 25, wherein receiving the physical uplink shared channel transmission comprises: receiving the physical uplink shared channel transmission using the first subset of the total number of sounding reference signal ports in the first sounding reference signal resource according to the indication of the sounding reference signal port configuration.

Aspect 27: An apparatus for wireless communications at a UE, comprising a processor; memory coupled with the processor; and instructions stored in the memory and executable by the processor to cause the apparatus to perform a method of any of aspects 1 through 15.

Aspect 28: An apparatus for wireless communications at a UE, comprising at least one means for performing a method of any of aspects 1 through 15.

Aspect 29: A non-transitory computer-readable medium storing code for wireless communications at a UE, the code comprising instructions executable by a processor to perform a method of any of aspects 1 through 15.

Aspect 30: An apparatus for wireless communications at a network entity, comprising a processor; memory coupled with the processor; and instructions stored in the memory and executable by the processor to cause the apparatus to perform a method of any of aspects 16 through 26.

Aspect 31: An apparatus for wireless communications at a network entity, comprising at least one means for performing a method of any of aspects 16 through 26.

Aspect 32: A non-transitory computer-readable medium storing code for wireless communications at a network entity, the code comprising instructions executable by a processor to perform a method of any of aspects 16 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving signaling configuring a sounding reference signal resource set comprising a first sounding reference signal resource of a plurality of sounding reference signal resources that is associated with a first subset of a total number of sounding reference signal ports supported by the UE and a second sounding reference signal resource of the plurality of sounding reference signal resources that is associated with a second subset of the total number of sounding reference signal ports supported by the UE, wherein a sum of the first subset of the total number of sounding reference signal ports and the second subset of the total number of sounding reference signal ports is equal to the total number of sounding reference signal ports;

transmitting sounding reference signals via at least one sounding reference signal resource of the plurality of sounding reference signal resources based at least in part on the signaling configuring a sounding reference signal resource set;

receiving a downlink control information message comprising an indication of a physical uplink shared channel transmission based at least in part on at least a subset of the total number of sounding reference signal ports; and transmitting the physical uplink shared channel transmission based at least in part on at least the subset of the total number of sounding reference signal ports.

2. The method of claim 1, wherein the indication of the physical uplink shared channel transmission comprises:
information in a sounding reference signal resource indicator field of the downlink control information message.

3. The method of claim 2, wherein transmitting the physical uplink shared channel transmission comprises:
transmitting the physical uplink shared channel transmission using the first subset of the total number of sounding reference signal ports in the first sounding reference signal resource according to the indication of the physical uplink shared channel transmission.

4. The method of claim 2, wherein the physical uplink shared channel transmission comprises:
transmitting a first portion of the physical uplink shared channel transmission using the first subset of the total number of sounding reference signal ports in the first sounding reference signal resource according to the indication of the physical uplink shared channel transmission; and
transmitting a second portion of the physical uplink shared channel transmission using the second subset of the total number of sounding reference signal ports in the second sounding reference signal resource according to the indication of the physical uplink shared channel transmission.

5. The method of claim 4, further comprising:
ordering the first subset of the total number of sounding reference signal ports and the second subset of the total number of sounding reference signal ports according to the indication of the physical uplink shared channel transmission, wherein transmitting the physical uplink shared channel transmission is based at least in part on the ordering.

6. The method of claim 4, further comprising:
precoding the first portion of the physical uplink shared channel transmission for the first subset of the total number of sounding reference signal ports; and
precoding, independently from the first portion of the physical uplink shared channel transmissions, the second portion of the physical uplink shared channel transmission for the second subset of the total number of sounding reference signal ports.

7. The method of claim 2, wherein the first sounding reference signal resource and the second sounding reference signal resource are located within a single symbol.

8. The method of claim 2, wherein:
the first sounding reference signal resource is located within a first symbol; and
the second sounding reference signal resource is located within a second symbol.

9. The method of claim 2, wherein:
each codepoint of the sounding reference signal resource indicator field is associated with a respective candidate sounding reference signal port configuration.

10. The method of claim 1, further comprising:
receiving, in the signaling configuring the sounding reference signal resource set comprising the plurality of sounding reference signal resources, an indication of a third sounding reference signal resource of the plurality of sounding reference signal resources that is associated with the total number of sounding reference signal ports supported by the UE, wherein transmitting the sounding reference signals is based at least in part on the indication of the third sounding reference signal resource of the plurality of sounding reference signal resources.

11. The method of claim 10, further comprising:
receiving signaling indicating whether the UE is to transmit the sounding reference signals via the third sounding reference signal resource, or a combination of the first sounding reference signal resource and the second sounding reference signal resource, wherein transmitting the sounding reference signals is based at least in part on the second signaling.

12. The method of claim 10, wherein the indication of the physical uplink shared channel transmission comprises:
information in a sounding reference signal resource indicator field of the downlink control information message, and wherein each codepoint of the sounding reference signal resource indicator field is associated with a respective candidate sounding reference signal port configuration.

13. The method of claim 12, wherein transmitting the physical uplink shared channel transmission comprises:
transmitting the physical uplink shared channel transmission using the first subset of the total number of sounding reference signal ports in the first sounding reference signal resource according to the indication of the sounding reference signal port configuration.

14. The method of claim 12, wherein transmitting the physical uplink shared channel transmission comprises:
transmitting a first portion of the physical uplink shared channel transmission using the first subset of the total number of sounding reference signal ports in the first sounding reference signal resource according to the indication of the sounding reference signal port configuration; and
transmitting a second portion of the physical uplink shared channel transmission using the second subset of the total number of sounding reference signal ports in the second sounding reference signal resource according to the indication of the sounding reference signal port configuration.

15. The method of claim 12, wherein transmitting the physical uplink shared channel transmission comprises:
transmitting the physical uplink shared channel transmission using the total number of sounding reference signal ports in the third sounding reference signal resource according to the indication of the physical uplink shared channel transmission.

16. A method for wireless communications at a network entity, comprising:
outputting signaling configuring a sounding reference signal resource set comprising a plurality of sounding reference signal resources, wherein a first sounding reference signal resource of the plurality of sounding reference signal resources is associated with a first subset of a total number of sounding reference signal ports supported by a user equipment (UE) and a second sounding reference signal resource of the plurality of sounding reference signal resources is associated with a second subset of the total number of sounding reference signal ports supported by the UE, wherein a sum of the first subset of the total number of sounding reference signal ports and the second subset of the total number of sounding reference signal ports is equal to the total number of sounding reference signal ports;
obtaining sounding reference signals via at least one sounding reference signal resource of the plurality of sounding reference signal resources based at least in part on the signaling configuring a sounding reference signal resource set;
outputting a downlink control information message comprising an indication of a physical uplink shared channel transmission based at least in part on at least a subset of the total number of sounding reference signal ports; and
receiving the physical uplink shared channel transmission based at least in part on at least the subset of the total number of sounding reference signal ports.

17. The method of claim 16, wherein the indication of the physical uplink shared channel transmission comprises:
information in a sounding reference signal resource indicator field of the downlink control information message.

18. The method of claim 17, wherein:
each codepoint of the sounding reference signal resource indicator field is associated with a respective candidate sounding reference signal port configuration.

19. The method of claim 16, wherein receiving the physical uplink shared channel transmission comprises:
receiving physical uplink shared channel transmission using the first subset of the total number of sounding reference signal ports in the first sounding reference signal resource according to the indication of the physical uplink shared channel transmission.

20. The method of claim 16, wherein receiving the physical uplink shared channel transmission comprises:
receiving a first portion of the physical uplink shared channel transmission using the first subset of the total number of sounding reference signal ports in the first sounding reference signal resource according to the indication of the physical uplink shared channel transmission; and
receiving a second portion of the physical uplink shared channel transmission using the second subset of the total number of sounding reference signal ports in the second sounding reference signal resource according to the indication of the physical uplink shared channel transmission.

21. The method of claim 16, wherein the first sounding reference signal resource and the second sounding reference signal resource are located within a single symbol.

22. The method of claim 16, wherein:
the first sounding reference signal resource is located within a first symbol; and
the second sounding reference signal resource is located within a second symbol.

23. The method of claim 16, further comprising:
outputting, in the signaling configuring the sounding reference signal resource set comprising the plurality of sounding reference signal resources, an indication of a third sounding reference signal resource of the plurality of sounding reference signal resources that is associated with the total number of sounding reference signal ports supported by the UE, wherein obtaining the sounding reference signals is based at least in part on the indication of the third sounding reference signal resource of the plurality of sounding reference signal resources.

24. The method of claim 23, further comprising:
outputting second signaling indicating whether the UE is to transmit the sounding reference signals via the third sounding reference signal resource, or a combination of the first sounding reference signal resource and the second sounding reference signal resource, wherein obtaining the sounding reference signals is based at least in part on the second signaling.

25. The method of claim 23, wherein the indication of the physical uplink shared channel transmission comprises:
information in a sounding reference signal resource indicator field of the downlink control information message, and wherein each codepoint of the sounding reference signal resource indicator field is associated with a respective candidate sounding reference signal port configuration.

26. The method of claim 25, wherein receiving the physical uplink shared channel transmission comprises:
receiving the physical uplink shared channel transmission using the first subset of the total number of sounding reference signal ports in the first sounding reference signal resource according to the indication of the sounding reference signal port configuration.

27. An apparatus for wireless communications at a user equipment (UE), comprising:
a processor;
memory coupled with the processor; and
one or more instructions stored in the memory and executable by the processor to cause the apparatus to, based at least in part on the one or more instructions:
receive signaling configuring a sounding reference signal resource set comprising a first sounding reference signal resource of a plurality of sounding reference signal resources that is associated with a first subset of a total number of sounding reference signal ports supported by the UE and a second sounding reference signal resource of the plurality of sounding reference signal resources that is associated with a second subset of the total number of sounding reference signal ports supported by the UE, wherein a sum of the first subset of the total number of sounding reference signal ports and the second subset of the total number of sounding reference signal ports is equal to the total number of sounding reference signal ports;
transmit sounding reference signals via at least one sounding reference signal resource of the plurality of sounding reference signal resources based at least in part on the signaling configuring a sounding reference signal resource set;

receive a downlink control information message comprising an indication of a physical uplink shared channel transmission based at least in part on at least a subset of the total number of sounding reference signal ports; and transmit the physical uplink shared channel transmission based at least in part on at least the subset of the total number of sounding reference signal ports.

28. The apparatus of claim 27, wherein the indication of the physical uplink shared channel transmission comprises:
information in a sounding reference signal resource indicator field of the downlink control information message.

29. An apparatus for wireless communications at a network entity, comprising:
a processor,
memory coupled with the processor, and
one or more instructions stored in the memory and executable by the processor to cause the apparatus to, based at least in part on the one or more instructions:
output signaling configuring a sounding reference signal resource set comprising a plurality of sounding reference signal resources, wherein a first sounding reference signal resource of the plurality of sounding reference signal resources is associated with a first subset of a total number of sounding reference signal ports supported by a user equipment (UE) and a second sounding reference signal resource of the plurality of sounding reference signal resources is associated with a second subset of the total number of sounding reference signal ports supported by the UE, wherein a sum of the first subset of the total number of sounding reference signal ports and the second subset of the total number of sounding reference signal ports is equal to the total number of sounding reference signal ports;

obtain sounding reference signals via at least one sounding reference signal resource of the plurality of sounding reference signal resources based at least in part on the signaling configuring a sounding reference signal resource set;

output a downlink control information message comprising an indication of a physical uplink shared channel transmission based at least in part on at least a subset of the total number of sounding reference signal ports; and receive the physical uplink shared channel transmission based at least in part on at least the subset of the total number of sounding reference signal ports.

30. The apparatus of claim 29, wherein the indication of the physical uplink shared channel transmission comprises:
information in a sounding reference signal resource indicator field of the downlink control information message.

* * * * *